US006363387B1

(12) United States Patent
Ponnekanti et al.

(10) Patent No.: US 6,363,387 B1
(45) Date of Patent: Mar. 26, 2002

(54) DATABASE SYSTEM PROVIDING METHODOLOGY FOR ENHANCING CONCURRENCY USING ROW UPDATE BIT AND DEFERRED LOCKING

(75) Inventors: Nagavamsi Ponnekanti, Emeryville; Jameison B. Martin, Oakland, both of CA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/364,981

(22) Filed: Jul. 31, 1999

Related U.S. Application Data

(60) Provisional application No. 60/105,047, filed on Oct. 20, 1998.

(51) Int. Cl.[7] .................................................. G06F 17/30

(52) U.S. Cl. .............................. 707/10; 707/201; 707/1

(58) Field of Search ................................ 707/202, 101, 707/3

(56) References Cited

U.S. PATENT DOCUMENTS

| | | | | |
|---|---|---|---|---|
| 4,606,002 | A | | 8/1986 | Waisman et al. |
| 4,677,550 | A | | 6/1987 | Ferguson |
| 4,791,561 | A | | 12/1988 | Huber |
| 4,805,099 | A | | 2/1989 | Huber |
| 4,947,320 | A | | 8/1990 | Crus et al. |
| 4,967,341 | A | * | 10/1990 | Yamamoto et al. |
| 5,089,952 | A | | 2/1992 | Bozman |
| 5,115,392 | A | | 5/1992 | Takamoto et al. |
| 5,123,104 | A | | 6/1992 | Levine et al. |
| 5,163,148 | A | | 11/1992 | Walls |
| 5,204,958 | A | | 4/1993 | Cheng et al. |
| 5,265,244 | A | | 11/1993 | Ghosh et al. |
| 5,386,557 | A | * | 1/1995 | Boykin et al. |
| 5,430,869 | A | | 7/1995 | Ishak et al. |
| 5,493,728 | A | | 2/1996 | Solton et al. |
| 5,504,888 | A | | 4/1996 | Iwamoto et al. |
| 5,555,389 | A | | 9/1996 | Satoh et al. |
| 5,721,909 | A | * | 2/1998 | Oulid-Aissa et al. |
| 5,835,757 | A | * | 11/1998 | Oulid-Aissa et al. |
| 5,842,196 | A | | 11/1998 | Agarwal et al. |
| 5,884,327 | A | * | 3/1999 | Cotner et al. ............... 707/202 |
| 5,983,225 | A | * | 11/1999 | Anfindsen ....................... 707/8 |
| 6,052,695 | A | * | 4/2000 | Abe et al. ................... 707/202 |
| 6,112,209 | A | * | 8/2000 | Gusack ....................... 707/101 |

* cited by examiner

*Primary Examiner*—Hosain T. Alam
*Assistant Examiner*—Tam V Nguyen
(74) *Attorney, Agent, or Firm*—John A. Smart

(57) ABSTRACT

A Client/Server Database System with improved methods for enhancing concurrency using a "row update" bit and deferred locking is described. Data rows in the system are designed to include ROW_DELETE and ROW_UPDATE status bits. When a transaction updates a row, it sets the ROW_UPDATE bit. When a transaction inserts a row, neither the ROW_UPDATE nor the ROW_DELETE status bits are set. When a transaction deletes a row, it sets the ROW_DELETE bit but the contents of the data row are left intact. Methods are described for processing database transactions (e.g., in response to SQL queries) using these status bits or flags, together with deferred locking techniques, in a manner that reduces locking overhead and increase concurrency. The approach provides a particular performance advantage over systems that employ row-level locking.

45 Claims, 7 Drawing Sheets

DATABASE SYSTEM PROVIDING METHODOLOGY FOR ENHANCING CONCURRENCY USING ROW UPDATE BIT AND DEFERRED LOCKING

RELATED APPLICATIONS

The present application claims the benefit of priority from and is related to the following commonly-owned U.S. provisional application: application Serial No. 60/105,047, filed Oct. 20, 1998. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to computer-implemented methodologies for enhancing concurrent access in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems,* Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase Adaptive Server™ database servers. Both Powersoft™ and Sybase Adaptive Server™ (formerly Sybase SQL Server™) are available from Sybase, Inc. of Emeryville, Calif.

To support multiple clients concurrently accessing data, a database system must employ some sort of concurrency control. Concurrency control is the way that a database synchronizes clients' or users' access to data to ensure that they do not destroy each other's work. Locking is the way that most databases handle concurrency control. While one user has a lock on a subset of the database, that data is "blocked" or protected from other users' attempts to make changes to it. One user's changes have to be "committed" before another user can see or further change the same data.

One of the characteristics of a locking scheme is the level of the locks. Some products default to physical storage page-level locks, while others default to logical row-level locks. Some products allow the user to specify which level of locking (page, row, or table) will be used for an individual table. Another of the characteristics of a locking scheme is the lock type, whether dynamic or static. A static locking scheme sets up one level of locking for each table in the database, often at table creation time or via database defaults. Dynamic locking attempts to optimize the granularity of locks depending on the particular change being made. A dynamic locking scheme will automatically increase the granularity of locks from row to page to table level when a certain threshold is met in the more fine-grained locks. The goal is to use the least amount of system overhead per lock while getting as many users safely into the database as possible. The usual approach is to start with a higher level lock, then reduce its granularity only when there is contention from another transaction that wants to lock the same page or table for an UPDATE, DELETE, INSERT, or SELECT operation. This minimizes the total number of locks.

The approach of initially using a lower granularity and escalating it when a threshold level is reached has problems. For example, escalation from row-level to page-level locks can cause deadlocks when two transactions attempt to acquire page-level locks on the same page at the same time. Page-level locking is particularly problematic for highly-concurrent data structures whose structures must be maintained, such as B-tree data structures. Conventionally, when two different transactions are attempting to insert into the same B-tree page, for instance, the underlying system employs transaction durational page-level locks, so that the two competing inserts would be serialized. If enough room does not exist for the inserts, the page is split. A split in one part of the tree does not occur in isolation but propagates to its parent. Often, the split is done as a separate action—a "nested top" action—within the transaction. After the split is completed, the system continues with the current transaction. If two transactions are trying to perform splits at different locations in the B-tree in a conventional system, the transactions are serialized, as a conventional system only allows one top action at a time. The process of serializing page splits leads to much contention among the multiple transactions concurrently executing within the system.

Each day more and more businesses are run from mission-critical systems which store information on server-based SQL database systems, such as Sybase Adaptive Server™. As a result, increasingly higher demands are being placed on server-based SQL database systems to provide enterprise-wide decision support. Since reducing the time required for processing queries substantially impacts system performance, it is highly desirable to optimize query processing. Without further optimization, processing of a query in real-time can be particularly burdensome, especially since a relatively high number of computations and possibly disk or network input/output operations must be performed in order to evaluate each row of the table or tables under examination. Accordingly, there is much interest in improving the performance of such tasks, particularly in terms of execution speed and reliability.

SUMMARY OF THE INVENTION

The present invention comprises a Client/Server Database System with improved methods for enhancing concurrency using a "row update" bit and deferred locking. In an exemplary embodiment, the system includes one or more Clients (e.g., Terminals or PCs) connected via a Network to a Server. The Server, operating under a server operating system (e.g., UNIX), includes a Database Server System, such as Sybase Adaptive Server™. In general operation, Clients store data in and retrieve data from one or more database tables resident on the Server by submitting SQL commands, some of which specify "queries"—criteria for selecting records of a table for a particular operation (e.g., updating). Queries are typically provided using a data manipulation language (DML), such as using the well-known SQL syntax.

The present invention introduces a methodology for using a "row update" (ROW_UPDATE) bit and deferred locking techniques that reduce locking overhead and increase concurrency, during database operations requiring access (e.g., query processing). Each data row employs ROW_DELETE and ROW_UPDATE status bits (flags or indicators). When a transaction updates a row, it sets the ROW_UPDATE bit. When a transaction inserts a row, neither the ROW_UPDATE nor the ROW_DELETE status bits are set. When a transaction deletes a row, it sets the ROW_DELETE bit but the contents of the data row are left intact. Note that if a row gets updated and then deleted, it will have both its ROW_UPDATE and ROW_DELETE status bits set. When an insert (operation) rolls back, it sets the ROW_DELETE bit. When a delete rolls back, it clears the ROW_DELETE bit. When an update (operation) rolls back, it restores the old image of the row, and thus the row gets whatever status bits that existed in the old image.

The ROW_UPDATE and ROW_DELETE bits are cleaned up as follows. When a scan requests a lock on a row with ROW_UPDATE bit set and gets LOCK_GRANTED status from the Lock Manager, it means that the transaction which set the ROW_UPDATE bit has completed and so the ROW_UPDATE bit can be cleared. Similarly a row with ROW_DELETE bit set can be removed from the page if it is determined that the deleting transaction has completed.

The basic approach or methodology adopted for table scans is as follows. The action taken by a scan depends on whether the row qualifies and the status of the row status bits. Qualification is done while holding a latch. First, the method examines the status (bits) of the data row under consideration (for locking). Four possible combinations exist: unset, delete, update, and update/delete. In the case that the status bits are not set (i.e., "unset"), the method proceeds to determine whether the data qualifies (i.e., the scan criterion). If the data qualifies ("yes" case), the method proceeds to grant the lock (request) and return the data row. If, however, the data does not qualify ("no" case), the row is instead skipped, as the row will never quailfy.

In the case that the status is "delete" (i.e., only the "delete" status bit is set), the method proceeds to determine whether the data qualifies. If the data qualifies, the method proceeds to process a request for an instant duration lock ("lock instant"). The instant duration lock is a mechanism that allows the client (requesting the lock) to see whether there exists a conflicting lock already held on the row (i.e., from another concurrent transaction). If no conflict is found, the "lock instant" request will be granted and the client will know that the "delete" has committed. Accordingly, the row may be skipped as the row is "deleted" (and that deletion has been committed). If a conflicting lock exists, however, the "lock instant" request will fail. Here, it is possible that the "delete" may in fact roll back (as a result of the roll back of another concurrent transaction). Accordingly, the client will instead block (i.e., sleep on the lock—a waiting for the lock to be granted) so that a rollback of the "delete" may be detected. On the other and, if the data does not qualify ("no" case), the method may proceed to skip the row as it will never qualify (even if the "delete" rolls back).

In the case that the status is "update" (i.e., only the "update" status bit is set), the method proceeds to determine whether the data qualifies. If the data qualifies ("yes"), the method proceeds to grant the lock and return the row. If the data does not qualify ("no" case), then a instant duration lock is requested. As was previously discussed above, the "lock instant" request serves as a shortcut method for determining whether the "update" has committed and, if not, for sleeping on the lock until the lock may be granted. If the "update" has committed (i.e., the "lock instant" request can be granted), the row is skipped (since, recall, the data does not qualify the scan criterion). Finally, it is possible that both "update" and "delete" (i.e., both the "update" and "delete" status bits) are set. Regardless of whether the data qualifies, the method will process a "lock instant" request/skip action, in a manner similar to that previously described.

Deferred locking is a technique where the Index Manager returns record IDs (RIDs) to the Data Layer without acquiring locks on them during scans that have scan arguments (SARGS) on columns not in the index; the Data Layer subsequently qualifies the data row and determines whether locking is really necessary. Conventionally, in index scans, locking is done in the Index Manager (based only on whether the index row qualifies). However, in accordance with the present invention, the locking is done after reading the data row, taking into account the status bits of data row and whether the data row qualifies. This optimization is performed when there are some qualification conditions on columns but not in the index.

The Index Manager qualifies index rows. It qualifies both the rows with and without the ROW_DELETE bit set. Rows that do not satisfy SARGS on index columns are discarded. If a qualifying row does not have its ROW_DELETE bit set, the RID from it is returned to the Data Layer. On the other hand, if the qualifying row has its ROW_DELETE bit set, an instant lock is acquired on it to see if the deleting transaction has committed. If the lock is granted (i.e., Lock Manager returns LOCK_GRANTED or LOCK_NOTNEEDED), the row is discarded. Otherwise, RID from the row is returned to the Data Layer.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
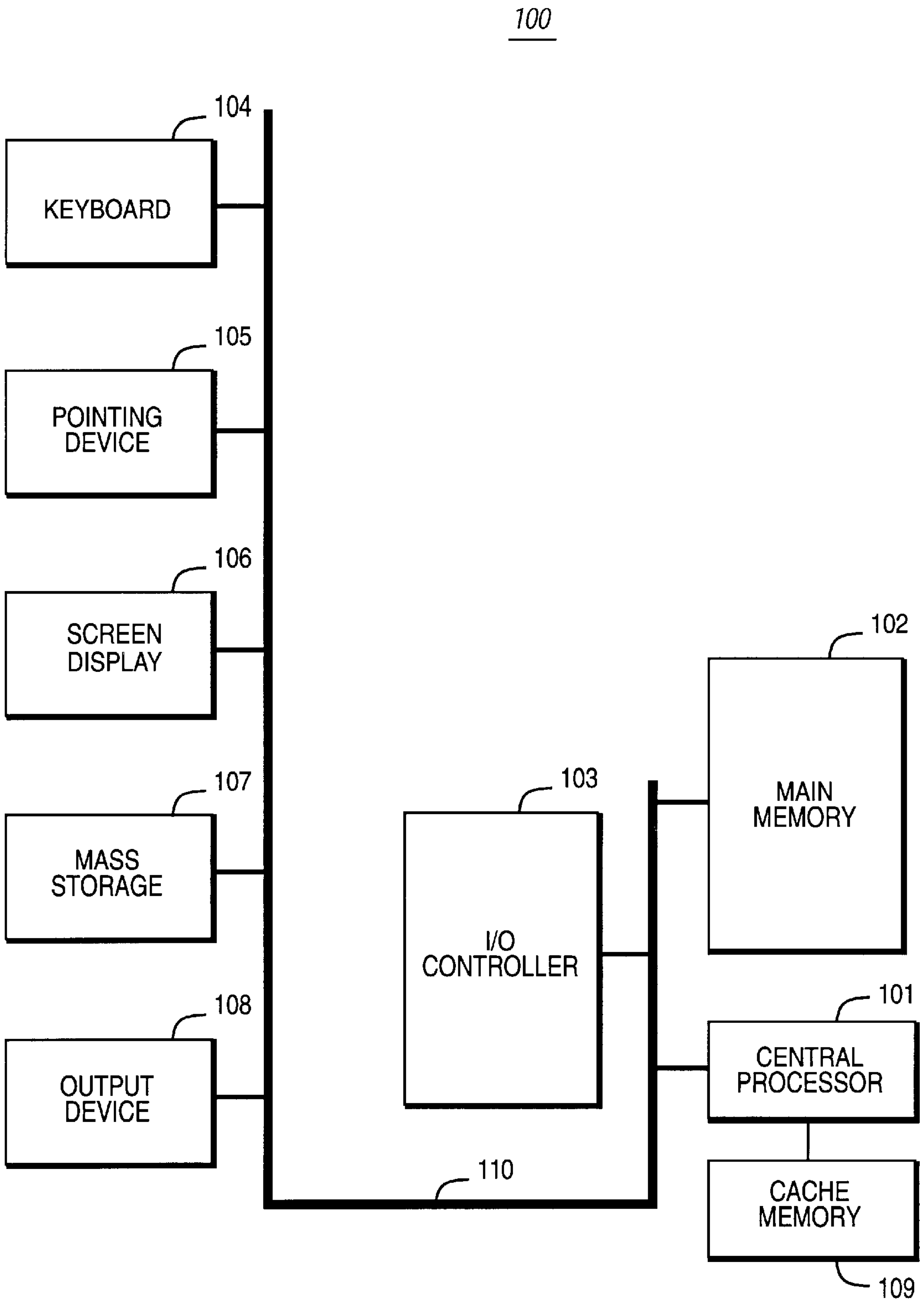
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a persistent or mass storage 107 (e.g., hard or fixed disk, removable or floppy disk, optical disk, magneto-optical disk, and/or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture, In a preferred embodiment, the system 100 includes an IBM-compatible personal computer system, available from a variety of vendors (including IBM of Armonk, N.Y.).

Standalone System Software

Figure 1B:
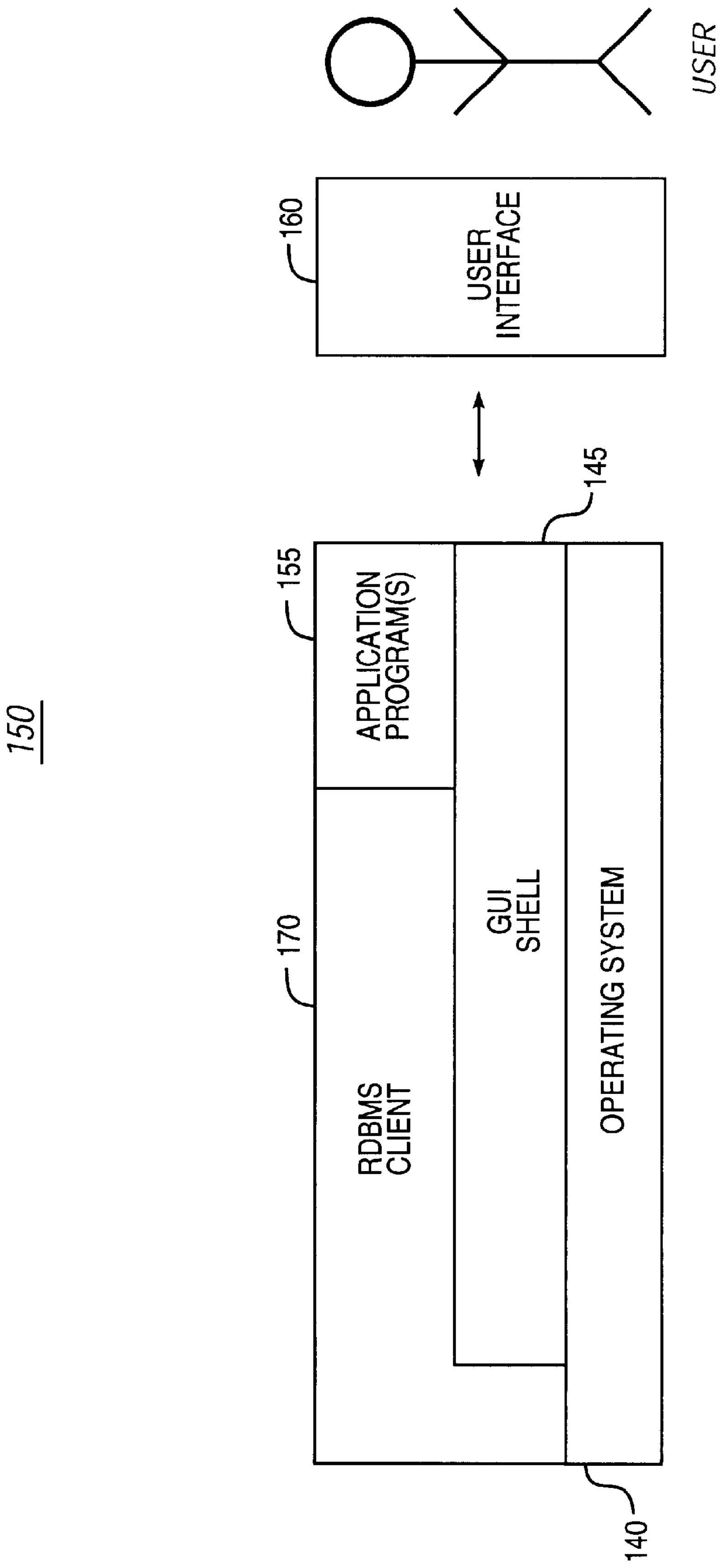
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a GUI (graphical user interface) shell 145. One or more application programs, such as application software 155, may be "loaded" (i.e., transferred from storage 107 into memory 102) for execution by the system 100. The system also includes a UI (user interface) 160 for receiving user commands as input and displaying user data as output. Although shown as a separate component, the UI 160 is typically provided by the GUI operating under the control of the OS 140, program(s) 155, and Relational Database Management System (RDBMS) client 170. The RDBMS client or "front-end" 170 itself may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2A:
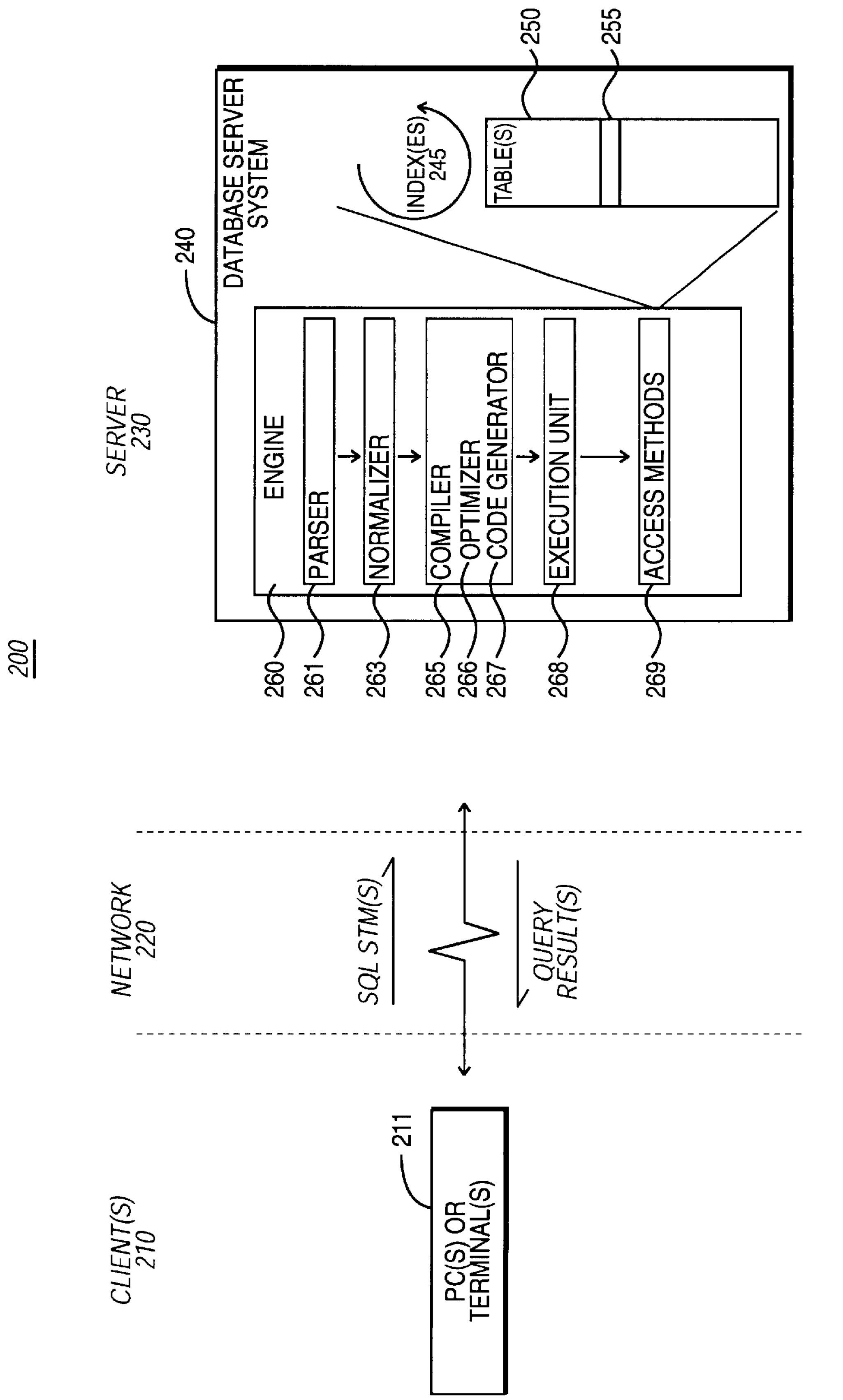
FIG. 2A is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2A illustrates the general structure of a Client/Server Database System 200 which is preferred for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server,* Second Edition, Addison-Wesley Publishing Company, 1995. For a discussion of a computer network employing Microsoft Networks/OpenNet File Sharing Protocol, see Method and System for Opportunistic Locking in a Networked Computer System, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare,* Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2A. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing EMPLOYEE table, for example, Position is one field, Date Hired is another, and so on. With this format, tables are easy for users to understand and use. Moreover, the flexibility of tables permits a user to define relationships between various items of data, as needed.

During a database session or "connection" with the Server, each Client issues one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned An Introduction to Database Systems. In addition to retrieving the data from Database Server tables, the Clients also include the ability to insert new rows of data records into the table; Clients can also modify and/or delete existing records in the table.

During system operation, the SQL statements received from the one or more Clients 210 (via Network 220) are processed by Engine 260 of the Database Server System 240. The Engine 260 itself comprises a Parser 261, Normalizer 263, Compiler 265, Execution Unit 268, and Access Methods 269. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 268. Operating under the control of these instructions, the Execution Unit 268 generates calls into lower-level routines, such as the Access Methods 269, for carrying out the query-specified operation, such as fetching relevant information (e.g., row 255) from the database table 250. After the plan has been executed by the Execution Unit, the Server returns a query result or answer table back to the Client(s).

For enhancing the speed in which the Database Server stores, retrieves, and presents particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. As clients insert more and more data into a particular one of the table(s) 250, a corresponding one of the index(es) 245 continues to grow. Before describing the methods of the present invention for enhancing concurrency, it is helpful to examine further the general methodology for storing and indexing data records in a database system.

Data Pages and Indexes

A. Data pages and page chain

Figure 2B:
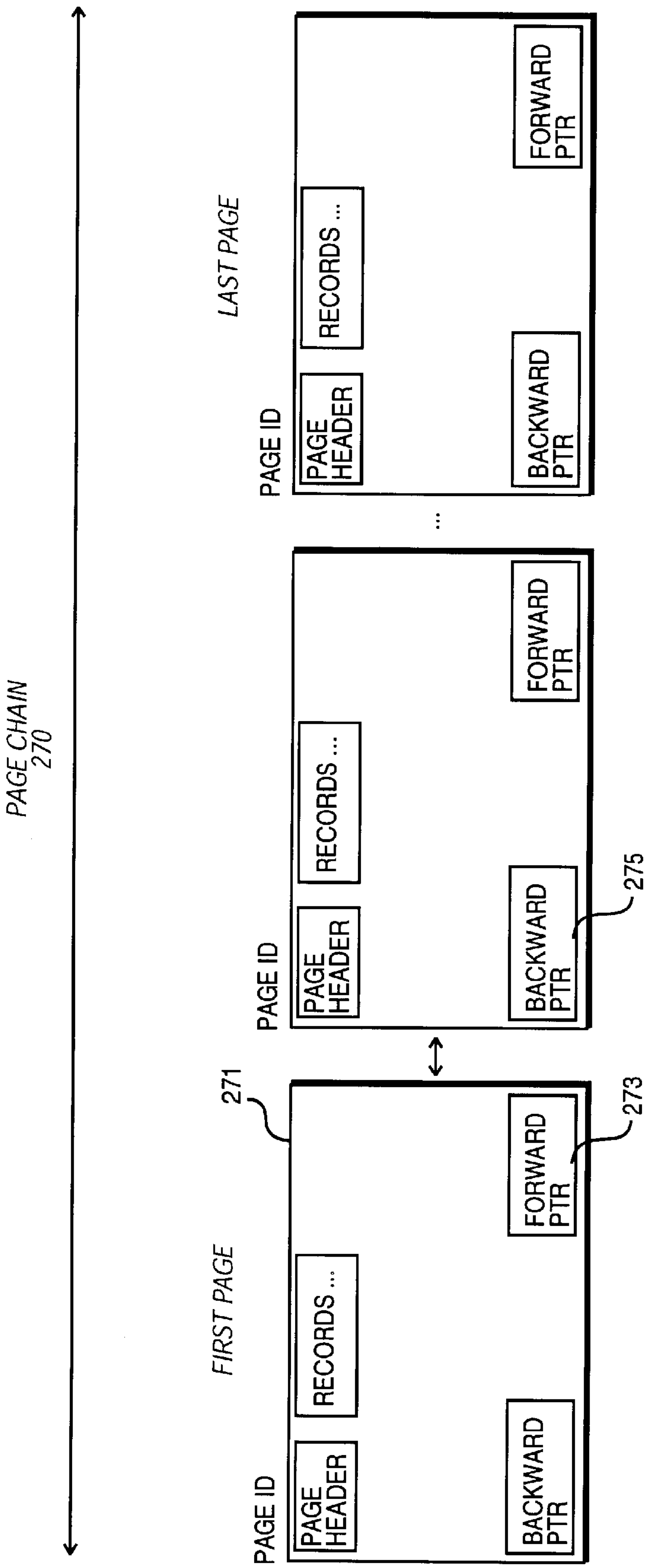
FIG. 2B is a block diagram illustrating a structure for storing data records, such as a "data page."

As shown in FIG. 2B, the data records or rows of a database table are actually stored in a particular structure known as a "data page." A data page may be viewed as a storage unit (e.g., 2K storage block) which holds one or more records, such as page 271. When a data page is "full," typically on the order of about 50 to 100 records, it is necessary to allocate a new data page. Every page which is allocated is linked to its previous and next neighboring pages via forward and backward page pointers (e.g., pointers 273, 275), so that logically a linked list or "chain" of pages exists. This forms the "page chain," such as the page chain 270 shown in FIG. 2B. Typically, identifiers or "Page IDs" for the first and last page of a page chain are maintained in a system catalog for the database.

Conventionally, only a single page chain is employed for a given object. A more advanced approach is to employ multiple page chains for a given object. Such an approach is described in commonly-owned, co-pending application Ser. No. 08/537,020, Database System with Methods for Partitioning an Object into Multiple Page Chains, filed Oct. 2, 1995, now U.S. Pat. No. 5,717,919, the disclosure of which is hereby incorporated by reference. It should be noted, however, that linking all data pages in a page chain is not required. Sybase Adaptive Server Enterprise™ (ASA 1192), for example, introduced new types of tables called "data only locked tables," in which data pages may not be linked in a page chain. A special data structure called object allocation map (OAM) is used to track data page IDs. If there is a need to scan all data pages, OAM is consulted.

B. Indexes

1. B-Trees

Locating a particular record or set of records by performing a sequential or linear scan from one end of a database table, comparing each record along the way, is an expensive operation. With such an approach, all of the blocks or pages of records would have to be visited until the record sought is finally located. For a table of even moderate size, such an approach yields unacceptable performance. As a result, virtually all modern-day relational database systems employ B-Tree indexes or a variant.

Figure 2C:
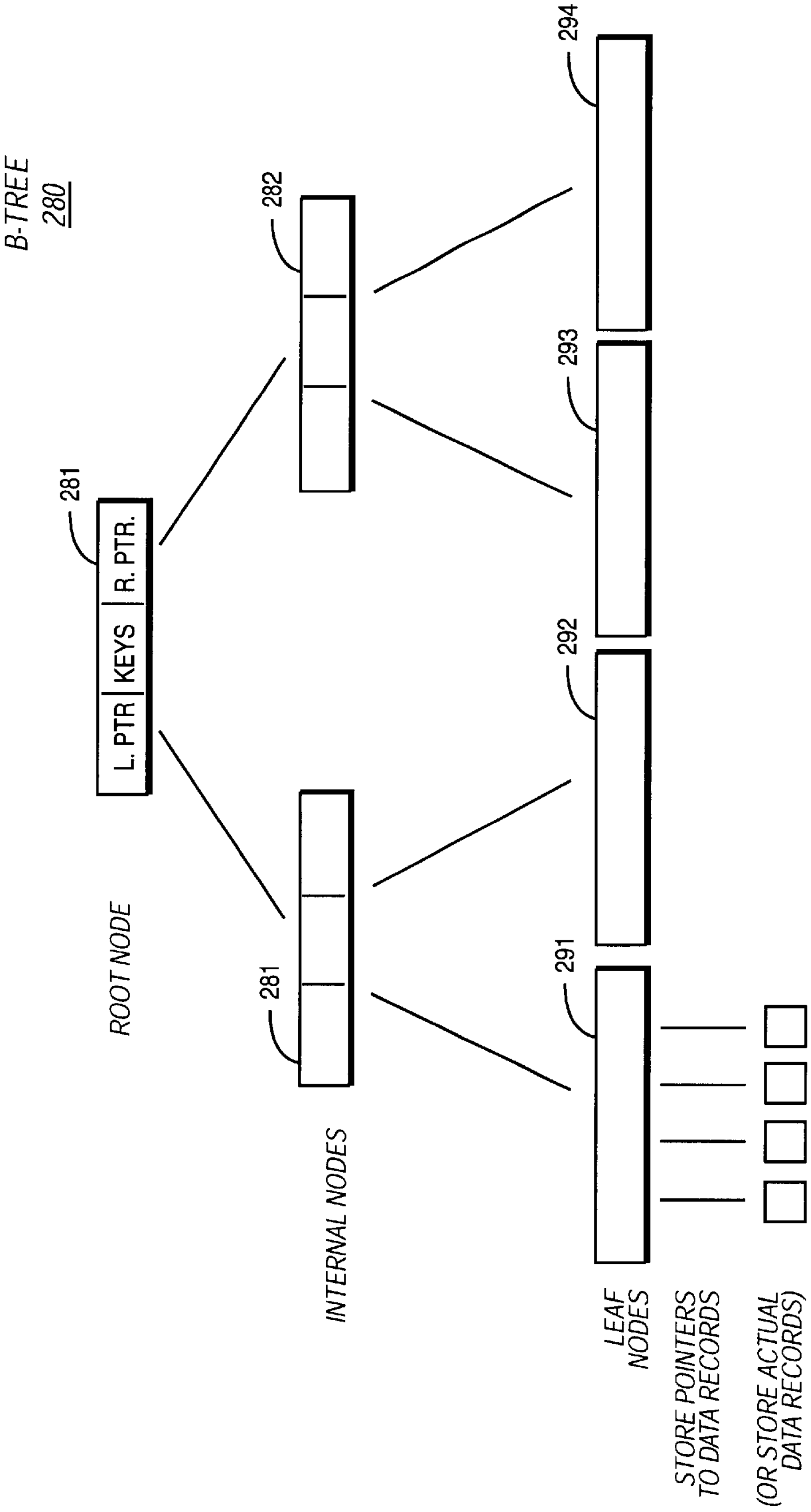
FIG. 2C is a block diagram illustrating a B-Tree storage structure.

FIG. 2C illustrates a simple B-Tree 280, which comprises a Root Node 281, Internal Nodes 281, 282, and Leaf (terminal) Nodes 291, 292, 293, 294. As shown, therefore, a B-Tree consists of a plurality of nodes arranged in a tree. Each node may, in turn, be thought of as a block of records. As shown by the Root Node 281, each node stores one or more key values ("keys") together with pointers to left and right children nodes (e.g., Nodes 281, 282 for Root Node 281).

Searching for a particular record with the help of a B-Tree occurs by traversing a particular path in the tree. To find a record with a particular key value, one would maneuver through the tree comparing key values stored at each node visited with the key value sought. The results of each comparison operation, in conjunction with the pointers stored with each node, indicate which path to take through the tree to reach the specific record desired. Ultimately, a search will end at a particular leaf node, such as leaf node 291. For a simple or "non-clustered" index, the leaf node will, in turn, point to (i.e., store a pointer to or identifier for) a particular data record for the key value sought.

For a "clustered index," on the other hand, the actual data of the data records are stored on the leaf nodes themselves. In other words, a clustered index is one in which the data of the table (i.e., data pages) are put directly on the leaf-level nodes of the B-Tree. This is in contrast to the abovementioned non-clustered index where the leaf nodes store only pointers to the actual data pages (which, because of their large size, are generally loaded as a heap, as needed). Present-day examples of systems employing clustered indexes include, for instance, Sybase Adaptive Server™ from Sybase, Inc. of Emeryville, Calif. Typically, such systems employ clustered indexes in addition to, not in lieu of, non-clustered indexes.

General techniques for the construction and operation of B-Trees are well documented in the technical, trade, and patent literature. For a general description, see Sedgewick, R., *Algorithms in C,* Addison-Wesley, 1990. For a description of B-Tree indexes implemented in a PC DBMS system, see Baker, M., *B-tree indexing: A look at indexing tradeoffs in dBASE, Clipper, and FoxPro,* Programmer's Journal, Vol. 8.6, November/December 1990, pp. 42–46. Also, see System and Methods for Information Retrieval, International Application No. PCT/US91/07260, International Publication No. WO 92/06440, Apr. 16, 1992, which describes B-Tree indexes for Fox® PC DBMS software. Multiple index files, including dBASE's mdx files, have also been described in the technical literature; see e.g., Freeland, R., *Exploring MDXs,* Data Based Advisor, February 1991, pp.85–87. The disclosures of each of the foregoing references are hereby incorporated by reference.

2. B-Tree Maintenance

Maintenance of B-Trees is fundamental to the operation of indexes in a database system. As new data records are loaded in a database table, the index (and corresponding in-memory B-Tree) for that table grows, to accommodate the new records. As a new record is added to a table, a corresponding index entry (typically, index key value plus record identifier) is added to an appropriate slot in the appropriate B-Tree node (i.e., the node which is appropriate for the key value expressed by the record). Since the nodes of the B-Tree have a finite size (generally, limited by the size of the database page employed), when an update operation occurs which exceeds the capacity of a particular node, an "overflow" condition exists at the node.

A node overflow is handled by splitting the particular node into two parts, for storing the new information (i.e., for storing the additional key value/record identifier for the new data which is being added). For data insert or update operations which are random, splitting the node "down the middle" yields good, and often optimal, results. For non-random ones, splitting can be optimized based on the particular load pattern of the update. Such as approach is described in commonly-owned, co-pending application Ser. No. 08/497,663, Database System with Improved Methods for B-tree Maintenance, filed Jun. 28, 1995, now U.S. Pat. No. 5,644,763, the disclosure of which is hereby incorporated by reference. Similar to a B-Tree node or page, a data page may overflow. In a corresponding manner, the data page may be split into two (or more) separate pages for accommodating the new data.

Improved Methodology for Enhancing Concurrency

A. Introduction

Concurrency provided by a database system is highly dependent on the criterion used for blocking. All other things being equal, the more the number of rows on which a scan needs to block, the less the concurrency. Consider a scan which needs to process a set s of rows of which only a subset, say q rows (where q is much smaller than s), qualifies the scan criterion. For example, take a scan on an EMPLOYEE table that is looking for employees with age>45 and salary<60K. If no index has age or salary (i.e., as indexed columns), every row in table needs to be examined even though only a few rows may qualify. Even when an index exists, if the index includes age or salary but not both, many index rows may qualify but only a few of them may satisfy both criteria.

If the scan attempts to lock each row in the set s, less concurrency results, as well as increased locking overhead. For example, a table scan would have to examine every row in the table and so every row may have to be locked. On the other hand, if the scan locks only the rows in set q, it may violate isolation-level semantics (i.e., that transactions are atomic) by causing result sets of scans to be affected by transactions which have aborted. When a transaction aborts, all its changes must be undone; the system must also ensure that it has not affected the results of other transactions running at read-committed or higher isolation levels.

Accordingly, the present invention introduces a computer-implemented methodology for using a "row update" (ROW_UPDATE) bit and deferred locking techniques that reduce locking overhead and increase concurrency. These techniques provide a particular performance advantage over systems that employ row-level locking.

B. Design

1. Data Only Locking

The present invention employs "data only locking" in which no logical locks are acquired on index pages. Two types of data only locking are provided: data row locking and data page locking. In data row locking, to lock a data row, the row identifier or rowid (RID) is used as a lock handle. RID consists of the system's page# (page number) and row# (row number) for the row. Index rows are of the form (key value, RID) where RID is the data row being pointed to by the index row. To lock an index key, the RID of the underlying data row is used as lock handle. Thus, the lock handle is always data rowid. Data page locking, on the other hand, is the same as data row locking except that the lock handle includes just the page# (i.e., row# is omitted). For clarity of description, the following discussion will focus on data row locking. Those skilled in the art, however, will appreciate that the description is easily extended to data page locking.

Additionally, since RID is used as a handle to lock in data only locking, the RID of a data row is kept invariant by the system for the life of the row. However, an exception is made for a reorganization utility which gets an EXCLUSIVE table lock and reorganizes the table possibly moving several rows and changing their RIDS.

2. Locking and Latching

"Latches" are a mechanism used to guarantee physical consistency of pages. For example, a transaction modifying a page holds an exclusive (EXCLUSIVE or EX) latch on the page, while a transaction reading a page holds a shared (SHARED or SH) latch; the reader is protected from seeing a physically inconsistent page. Thus, readers access pages under a SHARED latch and writers access pages under an EXCLUSIVE latch. Latches are held for a short-duration. For example, a latch is held only for the duration of modification of a page or duration of read (operation) from the page; they are not held for the duration of the transaction. Latches are held only on "kept" pages (i.e., pages that are guaranteed by the database system's buffer manager to not be replaced from the buffer cache), with the latch information being kept in the buffer header of the corresponding page. By keeping the information in the buffer header, the system can perform latching and unlatching more efficiently than locking and unlocking. In a no-contention case, latching is approximately ten times faster than locking. Since there is no deadlock detection performed on latches in a preferred embodiment, they must be acquired in a predetermined order and/or no-wait mode.

Locks are acquired for logical consistency—that is, to achieve "recoverability" and to achieve the semantics required by the isolation level at which the transaction is running, The ROW_UPDATE (bit) and deferred locking optimizations are generally not applicable for serializability and dirty reads isolation levels and so those isolation levels are not discussed here. Read committed and repeatable read isolation levels lock the same rows but differ in the duration of locks. In the latter case, the lock is released only when the transaction completes, while in the former case, a SHARED lock on a row can and is released once that row has been processed. (Note that if a row is inserted, deleted, or updated at any isolation level, an EXCLUSIVE lock is to be acquired on it and the lock has to be held until the end of transaction for recoverability reasons). The following discusses acquisition of locks, i.e., what rows are locked. Unless otherwise specified, it is assumed that a SHARED lock acquired at read committed isolation level is released as soon as the processing of that row has finished, while all locks acquired at repeatable read isolation level and exclusive locks acquired at read committed isolation level are released at the end of transaction.

When a lock is requested, three cases are possible:

(A) Same transaction is already holding a sufficient lock (e.g., it may have read or updated the same row in some earlier statement). In this case it is assumed that the Lock Manager grants the lock and returns LOCK_NOTNEEDED status.

(B) Another transaction is holding a conflicting lock. In this case, if it is an unconditional lock request, the transaction has to wait (e.g., sleep on the lock) for the other transaction to release the lock. The task is awakened when the lock can be granted and the Lock Manager returns LOCK GRANTED status. On the other hand, if the request is a conditional lock request, the Lock Manager returns LOCK_DIDNTQUEUE status and does not grant the lock.

(C) No transaction is holding a conflicting lock and the transaction requesting the lock is not already holding a sufficient lock. In the case, the Lock Manager grants the lock and it returns LOCK_GRANTED status.

It is also assumed that the Lock Manager can support instant duration lock requests. When an instant duration lock is requested, the Lock Manager returns LOCK_NOTNEEDED, LOCK_GRANTED or LOCK_DIDNTQUEUE in the same way as explained above. However, as the name indicates, the lock is held only for an instant duration, i.e., it is released even before the call to Lock Manager returns.

3. Lock Manager, Latch Manager, Access Methods and Query Processing Layer(s)

The "Lock Manager" is employed for providing interfaces for acquiring and releasing conditional and unconditional locks. In an analogous manner, a "Latch Manager" is employed to provide interfaces for acquiring and releasing conditional and unconditional latches. The Access Methods (module) calls the Lock Manager/Latch Manager to acquire and release locks and latches. Access Methods, as previously described, provides interfaces functions, such as performing a single table scan or an index scan and inserting a single row, deleting a single row specified by RID, and updating a row specified by RID given its new image, and the like. Access Methods employ an "Index Manager" which manages indices and a "Data Layer" (module) which manages data pages. A "Query Processing Layer" sits on top of Access Methods. It is responsible for splitting complex SQL statements into simpler operations that can be handled by the Access Methods.

4. Latching Protocols

As previously noted, deadlock detection is not performed on latches. Accordingly, the Latch Manager does not do deadlock detection and so callers to the Latch Manager are responsible for ensuring that they do not get into a latch deadlock or a mixed lock/latch deadlock situations. Accordingly, three constraints are imposed:

1) While holding a latch, only conditional locks can be requested. If the conditional lock cannot be granted by the Lock Manager, the latch is released and an unconditional lock is requested. This is used to prevent deadlocks involving both locks and latches.

2) Latches are released by the Access Methods before returning control to the Query Processing Layer. This is because the Query Processing Layer may perform joins, subqueries, or the like with the row returned by the Access Methods and it is hard to ensure a deadlock free operation. Also, latches are not intended to be held for such a long period.

3) Latches are released by the Index Manager before returning control to the Data Layer. This is to avoid latching a data page while holding a latch on the corresponding index page. Also, this allows better modularity by keeping the Data Layer and the Index Manager separate.

5. ROW_UPDATE and ROW_DELETE Status Bits (Each Data Row)

Each data row employs ROW_DELETE and ROW_UPDATE status bits (flags or indicators). When a transaction updates a row, it sets the ROW_UPDATE bit. When a transaction inserts a row, neither the ROW_UPDATE nor the ROW_DELETE status bits are set. When a transaction deletes a row, it sets the ROW_DELETE bit but the contents of the data row are left intact. Note that if a row gets updated and then deleted, it will have both its ROW_UPDATE and ROW_DELETE status bits set. When an insert (operation) rolls back, it sets the ROW_DELETE bit. When a delete rolls back, it clears the ROW_DELETE bit. When an update (operation) rolls back, it restores the old image of the row, and thus the row gets whatever status bits that exist in the old image.

The ROW_UPDATE and ROW_DELETE bits are cleaned up as follows. When a scan requests a lock on a row with ROW_UPDATE bit set and gets LOCK_GRANTED status from the Lock Manager, it means that the transaction which set the ROW_UPDATE bit has completed and so the ROW_UPDATE bit can be cleared. Similarly a row with ROW_DELETE bit set can be removed from the page if it is determined that the deleting transaction has completed.

6. Status Bits in Index Rows

Each index row employs a ROW_DELETE bit but no ROW_UPDATE bit. Update of an index row is always done as a delete followed by insert because the position in the index may change when the key value is updated. Accordingly, there is no need to have a ROW_UPDATE bit in index rows.

7. Scans

SARGS are scan arguments or predicates that are simple enough to be expressed in the form:

colid operator value where colid (column ID) specifies a particular column on which qualification condition needs to be applied. Here, operator is one of LT (less than), GT (greater than), EQ (equal to), NE (not equal to), LE (less than or equal to), GE (greater than or equal to), and value is a constant of the same data type as the column referred to by colid. For instance, salary<50K is a SARG but not (salary*3<50K). All scan predicates that can be expressed in the form of SARGS can be filtered by the Access Methods. Other complex predicates are filtered by Query Processing (module). Query Processing calls the Access Methods to perform a table scan or an index scan with an optional conjunct of SARGS. It returns only those rows that satisfy ALL SARGS.

8. Table Scans

Figure 3A:
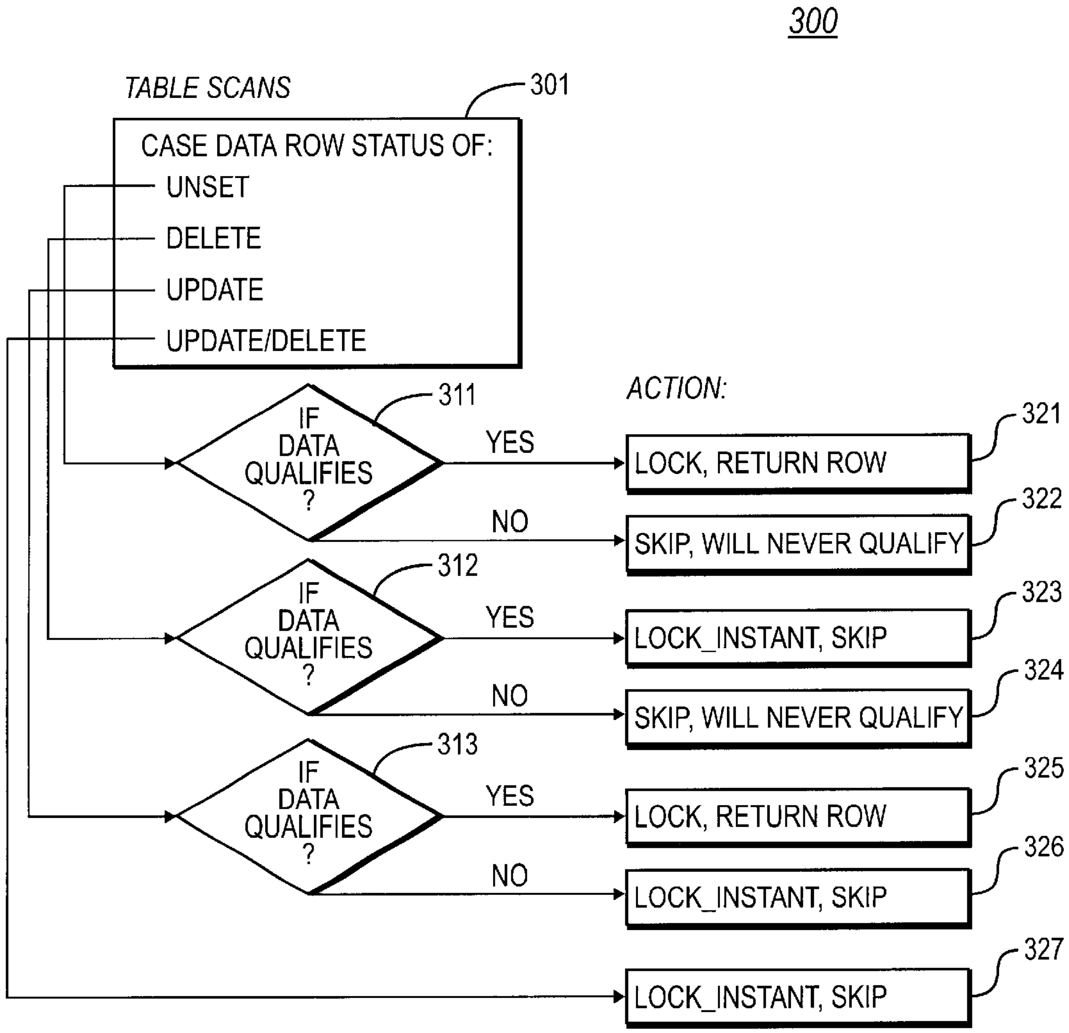
FIG. 3A is a flowchart of a method of the present invention that is adopted for table scans.

FIG. 3A is a flowchart of a method 300 illustrating the basic approach adopted for table scans. Here, the action taken by a scan depends on whether the row qualifies and the status of the row status bits. Qualification is done while holding a latch. At step 301, the method examines the status (bits) of the data row under consideration (for locking). Four possible combinations exist: unset, delete, update, and update/delete. In the case that the status bits are not set (i.e., "unset"), the method proceeds to step 311 for determining whether the data qualifies (i.e., the scan criterion). If the data qualifies ("yes" case), the method proceeds to grant the lock (request) and return the data row, as indicated by step 321. If, however, the data does not qualify ("no" case), the row is instead skipped, as the row will never qualify, as indicated by step 322.

In the case that the status is "delete" (i.e., only the "delete" status bit is set), the method proceeds to step 312 for determining whether the data qualifies. If the data qualifies, the method proceeds to process a request for an instant duration lock ("lock instant"). The instant duration lock is a mechanism that allows the client (requesting the lock) to see whether there exists a conflicting lock already held on the row (i.e., from another concurrent transaction). If no conflict is found, the "lock instant" request will be granted and the client will know that the "delete" has committed. Accordingly, the row may be skipped as the row is "deleted" (and that deletion has been committed). If a conflicting lock exists, however, the "lock instant" request will fail. Here, it is possible that the "delete" may in fact roll back (as a result of the roll back of another concurrent transaction). Accordingly, the client will instead block (i.e., sleep on the lock—a waiting for the lock to be granted) so that a rollback of the "delete" may be detected. On the other and, if the data does not qualify ("no" case at step 312), the method may proceed to skip the row as it will never qualify (even if the "delete" rolls back), as indicated by step 324.

In the case that the status is "update" (i.e., only the "update" status bit is set), the method proceeds to step 313 for determining whether the data qualifies. If the data qualifies ("yes"), the method proceeds to grant the lock and return the row, as indicated by step 325. If the data does not qualify ("no" case), then a instant duration lock is requested, as indicated at step 326. As was previously discussed above for step 323, the "lock instant" request serves as a shortcut method for determining whether the "update" has committed and, if not, for sleeping on the lock until the lock may be granted. If the "update" has committed (i.e., the "lock instant" request can be granted), the row is skipped (since, recall, the data does not qualify the scan criterion). Finally, it is possible that both "update" and "delete" (i.e., both the "update" and "delete" status bits) are set. Regardless of whether the data qualifies, the method will process a "lock instant" request/skip action, in a manner similar to that previously described. This is illustrated at step 327.

The basic action taken by the method may be summarized as follows.

TABLE 1

Table Scan Actions

| Data Row Status | Data Qualifies | Action |
|---|---|---|
| Unset* | Yes | LOCK, return row |
| Unset | No | Skip - will never qualify |
| Delete | Yes | LOCK_INSTANT, skip (block if lock cannot be granted because delete may roll back) |
| Delete | No | skip - will never qualify |
| Update | Yes | LOCK, return row |
| Update | No | LOCK_INSTANT, skip (block if lock cannot be granted because update may roll back and original Content may qualify) |
| Update/delete | Yes | LOCK_INSTANT, skip (block if lock cannot be granted because delete may roll back) |
| Update/delete | No | LOCK_INSTANT, skip (block if lock cannot be granted because update/delete may roll back and original row may qualify) |

(*Note: an uncommitted row with no DML (data manipulation language) bits set represents an uncommitted insert.)

Note that LOCK_INSTANT means that an instant duration lock is required. In both LOCK as well as LOCK_INSTANT cases, first a conditional lock is requested and if that fails, the page time-stamp is noted, the latch is dropped and an unconditional lock is requested. After wakeup from lock sleep, the latch is required and the page time-stamp is checked. If the page has changed since the latch was dropped, the lock is released and the row needs to be qualified again. Otherwise, the scan continues just as in the case where the conditional lock request was successful. Also, after the lock is acquired, if the Lock Manager returns LOCK_GRANTED, to indicate that no one is holding a lock and so the ROW_UPDATE bit can be cleared. This is because the row is no longer an uncommitted update. On the other hand, if the Lock Manager returns LOCK_NOTNEEDED, it means that the same transaction is holding a lock on the row and hence it could be an uncommitted update of the same transaction. In this case the ROW_UPDATE bit is not cleared.

9. Advantages of the ROW_UPDATE Bit

If a row does not qualify and does not have its ROW_UPDATE bit set, it is skipped. The rationale behind this is that, since ROW_UPDATE is not set, the row cannot be an uncommitted update. So either it is uncommitted insert or uncommitted delete or the row is committed; i.e., any transaction which has modified the row (either inserted/updated/deleted it) has committed. There is no reason to wait for a lock on uncommitted insert or uncommitted delete that does not qualify scan criterion because regardless of whether the inserting/deleting transaction rollsback, the row will not qualify anyway.

On the other hand, without the ROW_UPDATE bit, it may not be possible to determine if the row is an uncommitted insert or uncommitted update. Even if the row does not qualify, it is possible that some other transaction T has updated the row and the old image of the row may qualify the scan criterion (e.g., when the row is skipped and T rolls back). In such a case, the result set of scan was affected because of aborted transaction T, which violates the semantics of read committed isolation level.

C. Index Scans and deferred locking

1. General

During index scans, SARGS need not necessarily be on index columns only. For example, consider an EMPLOYEE table that has four columns: name, age, said and address. Suppose that there is a non-clustered index I on age. Consider the following query:

select*from employee where age>40 and salary<50K.

In this case, if the index casused to do scan, one SARG is on index column and one SARG is on a column, not in the index.

During index scans, the Index Manager returns RIDs from those index rows for which the index key value qualifies. In the above example, the Index Manager would return to the Data Layer the RIDs from all index rows for which age>40. The Data Layer, in response, retrieves the data row using the RID and checks if the row qualifies the SARGS on the non-index column. In the above example, the Data Layer would filter out the data rows which do not satisfy salary<50K.

Many systems employ an Index Manager that locks the RID before returning to the Data Layer. This may cause un necessary locking/blocking when there are SARGS on non-index columns. For instance, if some other transaction T has inserted an employee Tom who has said of 55K and age of 45, the scan would block on a lock for Tom. It is not necessary to block because regardless of whether T commits or rolls back, the row would not qualify.

2. Deferred Locking

Deferred locking is a technique where the Index Manager returns record IDs (RIDs) to the Data Layer without acquiring locks on them during scans that have scan arguments (SARGS on columns not in the index; the Data Layer subsequently qualifies the data row and determines whether locking is really necessary. Conventionally, in index scans, locking is done in the Index Manager (based only on whether the index row qualifies). However, in accordance with the present invention, the locking is done after reading the data row, taking into account the status bits of data row and whether the data row qualifies. This optimization is performed when there are some qualification conditions on columns but not in the index. In this manner, deferred locking reduces blocking in index scans which have SARGS on columns not in the index.

In operation, the Index Manager qualifies index rows. It qualifies both the rows with and without the ROW__DELETE bit set. Rows that do not satisfy SARGS on index columns are discarded. If a qualifying row does not have its ROW__DELETE bit set, the RID from it is returned to the Data Layer. On the other hand, if the qualifying row has its ROW__DELETE bit set, an instant lock is acquired on it to see if the deleting transaction has committed. If the lock is granted (i.e., Lock Manager returns LOCK__GRANTED or LOCK__NOTNEEDED), the row is discarded. Otherwise, RID from the row is returned to the Data Layer.

3. Updates/Delete/Inserts

Some race conditions are possible due to deferred locking. It is therefore important to understand the sequence of events during DML (data manipulation language, e.g., SQL) operations. During insert (operation) of a new row, the data row is inserted first and then index rows are inserted for each insert. During delete (operation) of a row, index rows are deleted from each index and then the data row is deleted. During update (operation) of a row, if the update is changing index columns, the index rows are deleted from each index affected by the update and then the data row is updated and the index rows are inserted into the affected indices. If none of the columns in an index are affected by the update, the index row for that index is left intact.

4. Race Conditions Due to Deferred Locking (a) Need to Check Index Pages

The Index Manager unlatches the index page before returning the RID to the Data Layer. Given the RID, the Data Layer retrieves the data page and latches it. Before latching of the data page, it is possible that another transaction has modified the data row. For example, another transaction may have deleted the data row or updated it such that index columns no longer qualify the scan criterion.

Therefore, the following approach is adopted. After latching the data page, the Data Layer calls the Index Manager to check if the page time-stamp of the index page has changed since the RID was returned. Note that the Index Manager performs this check without acquiring a latch on the index page. This is to avoid latching the index page while holding a latch on the data page. (The latch is not needed on the index page to check the time-stamp because the time-stamp of a page is always at the same offset within the page and the Index Manager is interested only in checking if time-stamp has changed or not). If the time-stamp has changed, then the Index Manager is asked to restart. Suppose that the Index Manager had returned a RID of 10.4 from an index row that has key value=14. If the Data Layer asks the Index Manager to restart, the Index Manager tries to locate (14, 10.4) in the index. If it is found, it is qualified again. Otherwise, the Index Manager continues the scan at the next row (i.e., first key in the index that is larger than (14, 10.4)).

Note that when the Data Layer requests a lock on a data row, it is possible that it may have to wait for ("sleep" on) the lock (i.e., conditional lock request may fail and it may have to drop the latch and request an unconditional lock). After waking up from lock sleep, it latches the data page again and asks the Index Manager to see if index page time-stamp has changed. If yes, it drops the latch and asks the Index Manager to restart as explained before. If the index page time-stamp has not changed, then it checks to see if data page time-stamp has changed. If yes, then the data row is requalified and the decision of whether to lock is revisited (just as in table scan). If the data page time-stamp has not changed, the Data Layer can proceed as if conditional lock request has succeeded.

(b) Stale Deletes

As mentioned before, the Index Manager may return RIDs from deleted index rows. It is possible that these deletes have happened some time ago and the corresponding data page no longer belongs to the same table now (i.e., it may have been deallocated and allocated to a different table or index, or it may just be an unallocated page). Therefore, when the data page is read, it needs to be validated; i.e., it is checked to see if it is still a data page of the same table. If not, the RID is discarded and the Data Layer requests the Index Manager for the next qualifying row.

(c) Transient Index Inconsistencies

During DML operations, there is a "window" between updating a data page and updating an index and in which some inconsistencies are possible. For instance, an index row may have been marked as deleted but the data row may not yet have been marked as deleted. Qualification of data row must account for that, and will now be described.

5. Qualification of Data Rows by Data Layer

Figure 3B:
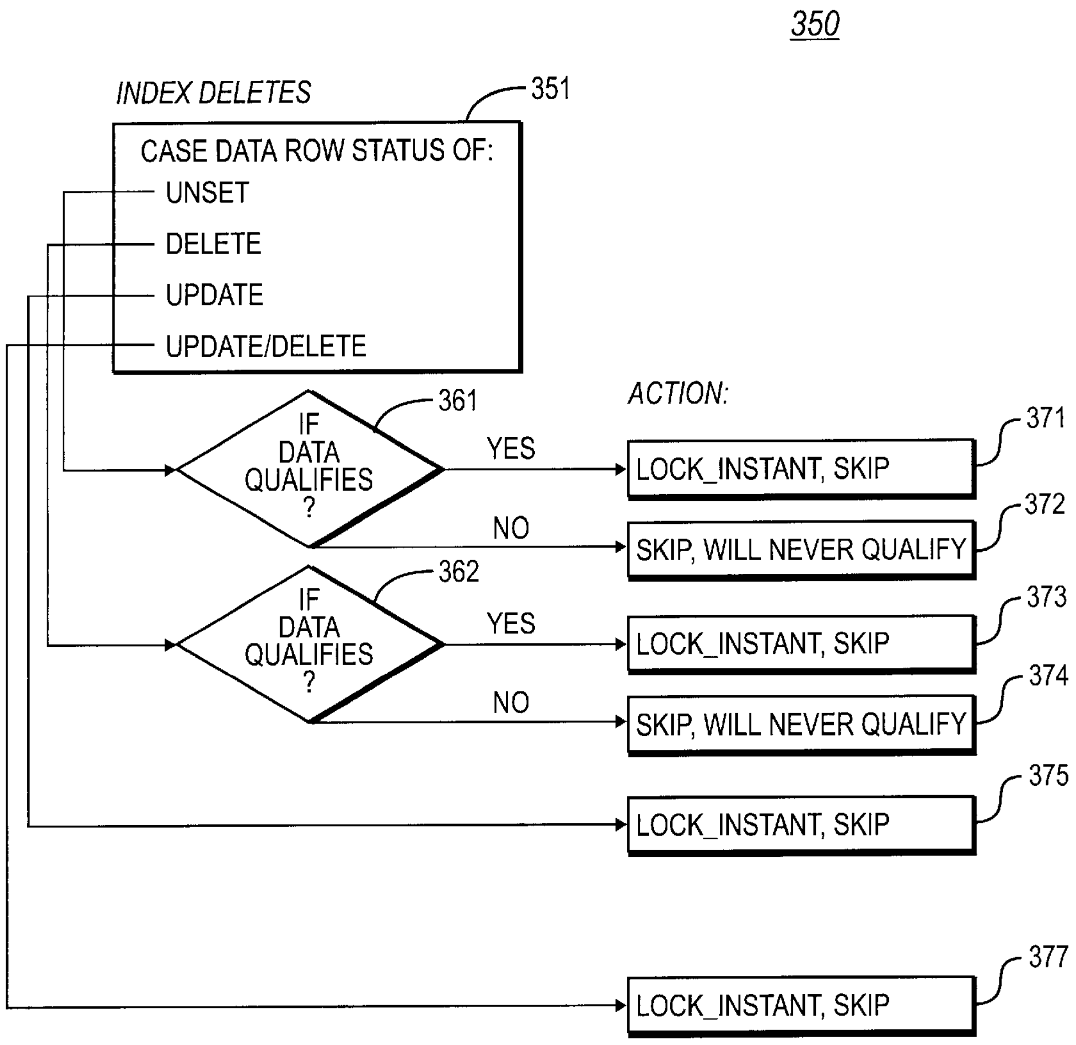
FIG. 3B is a flowchart of a method of the present invention that is adopted for qualifying data rows under the circumstance when an index row is a "delete" (i.e., its ROW_DELETE bit is set)

FIG. 3B is a flowchart of a method 350 illustrating the basic approach adopted for qualifying data rows under the circumstance when an index row is a "delete" (i.e., its ROW__DELETE bit is set). On the other hand, if the index key does not have its ROW__DELETE status set, the behavior is the same as for table scan.

At step 351, the method examines the status (bits) of the data row under consideration (for locking). As before, four possible combinations exist: unset, delete, update, and update/delete. In the case that the status bits are not set (i.e., “unset”), the method proceeds to step 361 for determining whether the data qualifies. If the data qualifies (“yes” case), the method will process a “lock instant” request/skip action, in a manner similar to that previously described, as illustrated by step 371. Otherwise, in a case where the data does not qualify (“no” case), the row is simply skipped, as the row will never qualify, as indicated by step 372.

In the case that the status is “delete” (i.e., only the “delete” status bit is set), the method proceeds to step 362 for determining whether the data qualifies. If the data qualifies, the method will process a “lock instant” request/skip action, as previously described. On the other and, if the data does not qualify (“no” case at step 362), the method may proceed to simply skip the row as it will never qualify (even if the “delete” rolls back), as indicated by step 374. In the remaining cases that the status is either “update” or “update/delete,” the method will, regardless of whether the data qualifies, process a “lock instant” request/skip action, in a manner similar to that previously described. This is illustrated at step 375 for the “update” case and 377 for the “update/delete” case.

The basic action taken by the method may be summarized as follows.

TABLE 2

Scan Behavior Qualification of Index Deletes

| Data Row Status | Data Qualifies | Action |
| --- | --- | --- |
| Unset | Yes | LOCK__INSTANT, skip (block if lock cannot be granted because it may be an update in progress) |
| Unset | No | skip - will never qualify |
| Delete | Yes | LOCK__INSTANT, skip (block if lock cannot be granted because delete may roll back) |
| Delete | No | skip - will never qualify |
| Update | Yes | LOCK__INSTANT skip (block if lock cannot be granted because update may roll back) |
| Update | No | LOCK__INSTANT, skip (block if lock cannot be granted because update may roll back) |
| Update/delete | Yes | LOCK__INSTANT, skip (block if lock cannot be granted because update may roll back) |
| Update/delete | No | LOCK__INSTANT, skip (block if lock cannot be granted because update may roll back) |

Appended herewith is an Appendix containing source code listings in the C Programming Language providing additional description of the present invention. A suitable C compiler for compiling the source listings is available from several vendors, including Microsoft of Redmond, Wash.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

Appendix A: Source Code 12 pages empty
code53/search.c
Page 1

```
typedef struct dol_pginfo
{
        BUF             *bp;
        DOL_DATAPAGE    *pg;
        uint16          rnum;
        SYB_BOOLEAN     is_latched;
        SYB_BOOLEAN     is_locked;              /* can be true if either the lock
                                                ** was acquired recently, or lock
                                                ** acquisition not needed because
                                                ** same page/row locked by same
                                                ** xact.
                                                */
} DOL_PGINFO;

/* Prototypes */
SYB_STATIC SYB_BOOLEAN validate__qualbranch     PROTO((BYTE *));
SYB_STATIC void         prQUALBRANCH            PROTO((BYTE *));
SYB_STATIC void                 dol__prefetch_forwrows  PROTO((SDES *, DOL_DAT
SYB_STATIC int                  dol__get_lock           PROTO((SDES *, DOL_PGI
SYB_STATIC void                 dol__prpginfo           PROTO((DOL_DATAPAGE *,

# define        STOPBIT (STOPEQ - EQ)

/* bit 0 = EQ bit 1 = LT bit 2 = GT */
# define        RETBITS         0x7


/**********************************************************
** defines for QUALBRANCH
*/
        /* BYTE 0 */
#define         QB_ROW_INS      0x00000000      /* there is not insert bit, ir
                                                ** is the absence of delete or update
                                                */
#define         QB_ROW_UPD      DOL_ROW_UPDATED
#define         QB_ROW_DEL      DOL_ROW_DELETED
#define         QB_ROW_DELUPD   (DOL_ROW_DELETED|DOL_ROW_UPDATED)


        /* BYTE 1 */
#define         QB_IND_SCN      0x00000100
#define         QB_NOIND_SCN    0x00000000


        /* BYTE 2 */
#define         QB_IND_DEL      0x00010000
#define         QB_IND_NODEL    0x00000000


        /* BYTE 3 */
#define QB_QUAL                 0x01000000
#define         QB_NOQUAL       0x00000000
/**********************************************************/


/*
** Fake define to use in assertions to clarify their intent
*/
#define QB_INTERNAL_ERROR       0
#define QB_INCONSISTENT_INDEX   0

/*
** The ordering of the branchkey depends
** on the base hardware.  The following
** defines are used to avoid any problems.
*/
#if NORMSHORT
# define BYTE3 3
# define BYTE2 2
# define BYTE1 1
# define BYTE0 0
#else
# define BYTE3 0
# define BYTE2 1
# define BYTE1 2
# define BYTE0 3
#endif /* NORMSHORT */
/*
** QUALBRANCH
**
** The information about a row is collected and set as different bits
** in branch. In dol_qualrow() we interpret the row after looking
** at these bits that get set here.
** Following information is collected
** 1) did the row qualify or not
** 2) is it an index scan or table scan
** 3) what is the status of the index row
** 4) properties of the row - (DOL_ROW_UPDATED, DOL_ROW_DELETED,
**                              DOL_ROW_POSSUNCMT)
**
** The mask DOL_ROWSTAT_DML_MASK cannot span more than a byte.
**
** Parameters:
**      BYTE            *status     (IN) - row status byte
**      SYB_BOOLEAN     indscan     (IN) - index scan or not
**      SYB_BOOLEAN     indkey_del  (IN) - was index key a delete
**      SYB_BOOLEAN     qualified   (IN) - did row qual
**      BYTE            branchkey[4](OUT) - branchkey
**
** Returns:
**      <nothing>
*/
#define         QUALBRANCH(status, indscan, indkey_del, qualified, branchkey)
do                                                                      \
{                                                                       \
        /*                                                              \
        ** Ensure that DOL_ROWSTAT_DML_MASK does not span               \
        ** more than a byte.                                            \
        */                                                              \
        SYB_ASSERT(DOL_ROWSTAT_DML_MASK <= 0xff);                       \
                                                                        \
        branchkey[BYTE3] = (BYTE)((status) & DOL_ROWSTAT_DML_MASK);     \
        branchkey[BYTE2] = (BYTE)(indscan);                             \
        branchkey[BYTE1] = (BYTE)(indkey_del);                          \
        branchkey[BYTE0] = (BYTE)(qualified);                           \
        SYB_ASSERT(validate__qualbranch(branchkey));                    \
                                                                        \
} while (0)



#define GL_SKIP_ROW             0x00
#define GL_NEXT_PAGE            0x01
#define GL_INDEXPG_CHANGED      0x02
#define GL_DATAPG_CHANGED       0x04
#define GL_DEADLOCK             0x08
#define GL_INTERRUPT            0x10
#define GL_OK                   0x20

/*
** DOL__GET_LOCK()
**
** Handles locking for the following cases:
**      lock home location, no forwarded page
**              lock: homepginfo->rnum
**              check TS change vs. home
**      lock home location, forwarded page set up and qualified
**              lock: homepginfo->rnum
**              check TS change vs. forwarded
**              may unlatch forwarded, will relatch
**      lock forwarded page, home already locked.
**              lock: forwpginfo->rnum
**              check TS change vs. forwarded
**              may unlatch home w/o relatching
**
** lkpage - page we are locking
** curpg - page for ts check
** other page - may be unlatched
**
** Returns:
**      GL_SKIP_ROW
**      GL_NEXT_PAGE
**      GL_INTERRUPT
**      GL_DEADLOCK
**      GL_INDEXPG_CHANGED
**      GL_DATAPG_CHANGED
**      GL_OK
*/
SYB_STATIC int
dol__get_lock(SDES *sdes, DOL_PGINFO *curpginfo, DOL_PGINFO *otherpginfo, BY
{
        DBTS            curpgts;
        DBTS            otherpgts;
        DOL_DATAPAGE    *curpg;
        BUF             *curbp;
        int             retstat;
        int             lstat;                  /* return from fglock */
        int             latchret;               /* return from BUF_LATCH() */
        LOCKREC         **lrp;
        SYB_BOOLEAN     otherpg_unlatched = FALSE;
        LOCALPSS(pss);

        curpg = curpginfo->pg;
        curbp = curpginfo->bp;
        lrp = (curpginfo->bp == sdes->sdatabuf) ? &sdes->sdatalock : &sdes->s

        /*
```

empty
code53/search.c
09536481.072399 Page 2

```
** current page should be latched
*/
SANITY_VERIFY_SHLATCHED(curbp);

/*
** Should not be table locked -- we shouldn't
** be getting fine grained locks if we hold
** a table lock.
*/
SYB_ASSERT(!(sdes->sstat2 & SS2_TABLOCK));

/*
** If buffer has been marked to be destroyed
** then we shouldn't not bother locking since
** this page is deallocated.
*/
if (curbp->bbuf_stat & BUF_PG_DESTROY)
{
        goto next_page;
}

/*
** Try to get the lock conditionally first.
*/
lstat = fglock(sdes,
                FGLK_DEFAULT,
                LOCK_NOQUEUE | duration,
                curpg->dol_pageno,
                curpginfo->rnum,
                LCTX_NONE,
                lrp,
                (LOCKRPT *)NULL);

/*
** Could not have waited and cannot deadlock or
** get an interrupt if we didn't wait.
*/
SYB_ASSERT(lstat != LOCK_WAITED);
SYB_ASSERT(lstat != LOCK_DEADLOCK);
/*
** Got lock.  See if we can clear the punc bit, etc.
*/
if (lstat == LOCK_GRANTED)
{
        if (duration != LOCK_INSTANT)
        {
                curpginfo->is_locked = TRUE;
        }

        return GL_OK;
}
else if (lstat == LOCK_NOTNEEDED)
{
        if (duration != LOCK_INSTANT)
        {
                curpginfo->is_locked = TRUE;
        }


        /*
        ** We promoted.  We need to unlatch the
        ** pages now.
        */
        if (sdes->sstat2 & SS2_TABLOCK)
        {
                if (curbp && curpginfo->is_latched)
                {
                        BUF_UNLATCH(curbp, pss);
                        curpginfo->is_latched = FALSE;
                }
                if (otherpginfo && otherpginfo->bp && otherpginfo->is_
                {
                        BUF_UNLATCH(otherpginfo->bp, pss);
                        otherpginfo->is_latched = FALSE;
                }
        }
        return GL_OK;
}

/*
** We must have gotten LOCK_DIDNTQUEUE to get here.
*/
SYB_ASSERT(lstat == LOCK_DIDNTQUEUE);
MONITOR_INC(mc_dolaccess(dolscan_condlock_fail));

if ((sdes->sstat & SS_READPAST) && (!(sdes->sstat2 & SS2_BLKREADPAST))
{
        /*
        ** If we were on the home page, unkeep and unlatch
        ** the forwarded page
        */
        if (otherpginfo && otherpginfo->bp && (otherpginfo->bp == sdes
        {
                bufunkeep(otherpginfo->bp,
                        sdes,
                        (otherpginfo->is_latched) ? UNLATCH : NO_LATCH
                otherpginfo->bp = (BUF *)NULL;
                sdes->sforwbuf = (BUF *)NULL;
                otherpginfo->is_latched = FALSE;
        }
        return GL_SKIP_ROW;
}

/*
** Grab timestamp before unlatching
*/
DBTS_PGET((ANYPAGE *)curpg, &curpgts);

BUF_UNLATCH(curbp, pss);
curpginfo->is_latched = FALSE;
if (otherpginfo && otherpginfo->bp && otherpginfo->is_latched)
{
        DBTS_PGET((ANYPAGE *)otherpginfo->pg, &otherpgts);
        BUF_UNLATCH(otherpginfo->bp, pss);
        otherpginfo->is_latched = FALSE;
        otherpg_unlatched = TRUE;
}

/*
** Unconditional lock. Note that in case this lock
** request gets into a deadlock, lock manager will
** try to identify the sdes that was used to make the
** lock request by matching sdes->scur.pageid to
** the page on which lock was requested. This is
** to identify if lock request was made in the context
** of a backward scan(for informational purpose only).
** At this point sdes->scur is pointing to home pageid and
** that's what we want. Lock requests made on forwarded
** page/row are not considered to be due to backward scan.
*/
lstat = fglock(sdes,
                FGLK_DEFAULT,
                duration,
                curpg->dol_pageno,
                curpginfo->rnum,
                LCTX_NONE,
                lrp,
                (LOCKRPT *)NULL);

SYB_ASSERT((lstat != LOCK_DIDNTQUEUE) && (lstat != LOCK_DIDNTWAIT));

if (lstat < 0)
{
        sdes->sstat |= SS_ENDSCAN;
        if (lstat == LOCK_DEADLOCK)
        {
                retstat = GL_DEADLOCK;
        }
        else
        {
                retstat = GL_INTERRUPT;
        }
        goto cleanup;
}

SYB_ASSERT((lstat == LOCK_GRANTED) ||
                (lstat == LOCK_WAITED) ||
                (lstat == LOCK_NOTNEEDED));

if (duration != LOCK_INSTANT)
{
        curpginfo->is_locked = TRUE;
}

/*
** If buffer has been marked to be destroyed
** then we shouldn't bother continuing.
*/
if (curbp->bbuf_stat & BUF_PG_DESTROY)
{
        goto next_page;
}

/*
** If row locking, relatch.  If we were page
** locking, we don't need to relatch if we
** now hold a page lock.  Note that we might
** have requested an instant duration page lock
```

```
	** and have gotten it.  In this case lrp is
	** NULL because the lock was released (never
	** held).
	*/
	if (!(sdes->sstat2 & SS2_TABLOCK) &&
		(!((sdes->sstat3 & SS3_PAGELOCK) && *lrp)))
	{
		BUF_LATCH(sdes, curbp, SH_LATCH, UNCONDITIONAL_LATCH, latchret
		curpginfo->is_latched = TRUE;
	}

	/*
	** If the other page was unlatched, then
	** we need to relatch that too unless we
	** promoted to a table lock.
	*/
	if (otherpg_unlatched && !(sdes->sstat2 & SS2_TABLOCK))
	{
		/*
		** If we are already holding a latch, request the
		** latch in demand mode to prevent deadlocks.
		*/
		BUF_LATCH(sdes, otherpginfo->bp, SH_LATCH,
			(curpginfo->is_latched ?
			 DEMAND_LATCH :
			 UNCONDITIONAL_LATCH),
			latchret);
		otherpginfo->is_latched = TRUE;
	}

	/*
	** If we are doing an index scan, we need to make
	** sure that the index key hasn't changed.  We
	** only need to do this if we are locking the
	** home location.  If we already have the
	** home location locked then the index entry
	** cannot have changed.
	*/
	if ((sdes->sindid > TABENTRY) &&
		(curpginfo->bp == sdes->sdatabuf) &&
		(BT_CURSCANPG_CHANGED(sdes)))
	{
		retstat = GL_INDEXPG_CHANGED;
		goto cleanup;
	}

	/*
	** Page changed -- need to get currow again.
	*/
	if (DBTS_PGNEQ((ANYPAGE *)curpginfo->pg, &curpgts))
	{
		MONITOR_INC(mc_dolaccess(dolscan_datapg_changed));
		/*
		** Make sure rnum is legit.  This
		** is impossible if we are on the forwarded
		** page because the home location was
		** locked which prevents a modification
		** to the forwarded location.
		*/
		if (curpginfo->rnum >= curpg->dol_nextrno)
		{
			SYB_ASSERT(curpginfo->bp != sdes->sforwbuf);
			goto next_page;
		}
		if ((currow = DOL_GET_ROWPTR(curpg, curpginfo->rnum)) == (BYTE
		{
			SYB_ASSERT(curpginfo->bp != sdes->sforwbuf);
			goto next_page;
		}

		/*
		** Since the page has change, the current
		** row will have to be requalified.
		*/
		return GL_DATAPG_CHANGED;
	}

	if (otherpginfo && otherpginfo->bp && (otherpginfo->bp == sdes->sforwb
	{
		if (DBTS_PGNEQ((ANYPAGE *)otherpginfo->pg, &otherpgts))
		{
			MONITOR_INC(mc_dolaccess(dolscan_datapg_changed));
			/*
			** Make sure rnum is legit.  This
			** is impossible if we are on the forwarded
			** page because the home location was
			** locked which prevents a modification
			** to the forwarded location.
			*/
				SYB_ASSERT(otherpginfo->rnum < otherpginfo->pg->dol_ne
				return GL_DATAPG_CHANGED;
			}
	}
	return GL_OK;

next_page:
	if (otherpginfo && otherpginfo->bp && (otherpginfo->bp == sdes->sforwb
	{
		bufunkeep(otherpginfo->bp, sdes,
			(otherpginfo->is_latched) ? UNLATCH : NO_LATCH);
		sdes->sforwbuf = (BUF *)NULL;
		otherpginfo->bp = (BUF *)NULL;
		otherpginfo->is_latched = FALSE;
	}
	else
	{
		sdes->sstat3 &= ~SS3_SDATABUF_PGLOCKED;
	}
	fgunlock(sdes, lrp, FGUNLK_OVERRIDE);
	return GL_NEXT_PAGE;

cleanup:
	SYB_ASSERT(retstat & (GL_INTERRUPT|GL_DEADLOCK|GL_INDEXPG_CHANGED));
	/*
	** Return condition: home page/row
	**	locked: maybe
	**	kept:   yes
	**	latched: no
	**
	** forwarded page/row:
	**	locked: no
	**	kept:   no
	**	latched: no
	*/
	if (sdes->sforwlock)
	{
		fgunlock(sdes, &sdes->sforwlock, FGUNLK_OVERRIDE);
	}

	if (curpginfo->is_latched)
	{
		BUF_UNLATCH(curbp, pss);
		curpginfo->is_latched = FALSE;
	}

	/*
	** Unkeep/unlatch forwarded buffer
	*/
	if (otherpginfo && otherpginfo->bp && (otherpginfo->bp == sdes->sforwb
	{
		bufunkeep(otherpginfo->bp, sdes,
			(otherpginfo->is_latched) ? UNLATCH : NO_LATCH);
		otherpginfo->is_latched = FALSE;
		otherpginfo->bp = (BUF *)NULL;
		sdes->sforwbuf = (BUF *)NULL;
	}
	else if (otherpginfo && otherpginfo->bp && otherpginfo->is_latched)
	{
		BUF_UNLATCH(otherpginfo->bp, pss);
		otherpginfo->is_latched = FALSE;
	}

	return retstat;
}



/*
** QB_GET_LOCK
**
** Call dol__get_lock() and branch accordingly based
** on its return status.
**
** Side Effects:
**	sets glstat
**	branches
*/
#define QB_GET_LOCK(sdes, curpginfo, otherpginfo, currow, duration) \
{								\
	glstat = dol__get_lock((sdes), (curpginfo),		\
			((otherpginfo) && (otherpginfo)->bp) ?	\
				(otherpginfo) : NULL,		\
			(currow),				\
			(lock_duration));			\
	if (glstat == GL_SKIP_ROW)				\
```

```
        {                                                               \
                goto next_row;                                          \
        }                                                               \
        else if (glstat == GL_DATAPG_CHANGED)                           \
        {                                                               \
                goto requal;                                            \
        }                                                               \
        else if (glstat != GL_OK)                                       \
        {                                                               \
                *index_restart = (glstat == GL_INDEXPG_CHANGED);        \
                goto abort;                                             \
        }                                                               \
        /* for GL_OK, fall through */                                   \
}
/*
** SYB_BOOLEAN DOL_QUALROW(sdes, bp, indekey_del, is_lathced, index_restart)
**
**      Pretty much the same as qualpage, but only qualify
**      a single row.  Only on new pages.  Does row locking
**      if SS3_ROWLOCK is set.
**
** Parameters:
**      sdes            - (IN)
**      bp              - (IN)
**      indkey_del      - (IN) was this row pointed at by an index key that
**                              is marked as delete?
**      index_restart   - (OUT) does the scan need to be restarted
**                              (e.g. index page changed).
**
**
** Assumptions:
**      Page is stable -- either latched or page locked.
**
** Returns:
**      TRUE/FALSE      - indicates whether a row qualified
**
** Side-Effects:
**      if TRUE:
**              not forwarded row:
**                      sdatabuf is kept
**                      sdatabuf is latched if necessary
**                      sdatabuf is locked if necessary
**                      scur is home rid
**                      srow -> sdatabuf
**
**              forwarded row:
**                      sdatabuf is kept
**                      sdatabuf NOT latched
**                      sdatabuf is locked if necessary
**                      scur is home rid
**                      srow -> sforwbuf
**
**                      sforwbuf is kept
**                      sforwbuf is latched if necessary
**                      sforwbuf is locked if necessary
**                      sforwr is set up
**      if FALSE:
**              sdatabuf is kept
**              sdatabuf NOT latched
**              sdatalock is NULL if row locked, may be locked if page lock
**              scur is last rid we tried if table scan
**
**              sforwbuf NULL
**              sforwlock NULL
**
**      Sets the following fields in the sdes:
**              srow    - pointer to the qualifying row
**              scur    - sets to the row/page id combo
**
**      May obtain locks and/or latches.
**
** History:
**      08/03/97 (jamie)        - created
*/
SYB_BOOLEAN
dol_qualrow(SDES *sdes, BUF *bp, SYB_BOOLEAN indkey_del, SYB_BOOLEAN is_latch
{
        SYB_BOOLEAN     qualified = TRUE;
        DOL_PGINFO      *curpginfo;
        DOL_PGINFO      homepginfo;
        DOL_PGINFO      forwpginfo;
        uint16          end_rnum;       /* last row offset entry to check*/
        BYTE            *currow = NULL;
        BYTE            *home_currow;
        int             lock_duration;
        uint32          branch = 0;     /* branch value for humongous switch c
        BYTE            *branch_bytep;  /* char ptr to int, to allow easy acce
        int             minlen;
        int             num_sargs;
        SARG            *sargs;
        int             glstat = GL_OK;
        int             lret;
        BYTE            home_stat;
        SYB_BOOLEAN     tablescan = FALSE;
        LOCALPSS(pss);

        branch_bytep = (BYTE *)&branch;
        homepginfo.bp = bp;
        homepginfo.pg = &(bp->bpage->dolp);

        /* Page passed in must agree with sdes->scur */
#if 0
        /* pagelinkage DOL scan messes with sdes->scur.
        ** So comment this assertion until caller is fixed.
        */
        SYB_ASSERT(sdes->scur.pageid == bp->bpage->dolp.dol_pageno);
#endif

        /*
        ** Latched if not page latching and not page
        ** locking and sdatalock
        */
        homepginfo.is_latched = is_latched;

        /*
        ** Locked if:
        **      we have a lockrec, or
        **      table lock, or
        **      datapage locked, or
        **      locked before qualification by
        **              index mgr or oam mgr
        */
        homepginfo.is_locked = (sdes->sdatalock ||
                                (sdes->sstat2 & SS2_TABLOCK) ||
                                (sdes->sstat3 &
                                        (SS3_SDATABUF_PGLOCKED|SS3_LOCKEDPREA(

        homepginfo.rnum = sdes->scur.row.rnum;
        forwpginfo.bp = (BUF *)NULL;
        minlen = homepginfo.pg->dol_minlen;
        curpginfo = &homepginfo;

        lock_duration = (sdes->sstat & SS_CURSINSTAB) ? LOCK_INSTANT : 0;

#if SANITY
        /*
        ** Make sure we have the lock we think we have.
        */
        if (homepginfo.is_locked)
        {
                fglock_verify(sdes, FGLK_DEFAULT, sdes->scur.pageid, homepgin!
        }
        if ((sdes->sstat2 & SS2_QPSCAN) && TRACE(ACCESS,31))
        {
                dol__prpginfo(homepginfo.pg, FALSE);
        }

        /*
        ** Assert that we have the correct type of
        ** page (dol datapage).
        */
        SYB_ASSERT((homepginfo.pg->dol_stat & PG_XHEADER) &&
                (XHDRPAGE_GETPAGETYPE(bp->bpage) == PG2_DOL_DATAPG));

        /*
        ** SS3_SROWLATCHED should always be cleared before
        ** entering this routine.
        */
        SYB_ASSERT(!(sdes->sstat3 & SS3_SROWLATCHED));

        /*
        ** If we think we have the page latched, it had
        ** better be latched.  We shouldn't have more than
        ** one page latched at this point.
        */
        SYB_ASSERT(buf_num_latches_held() == ((homepginfo.is_latched) ? 1:0));
#endif

        /*
        ** Default is match one rid, using all sargs
        */
        num_sargs = sdes->skeycnt;
        sargs = sdes->skeyp;
        end_rnum = homepginfo.rnum;

        /*
        ** If we are
        ** 1) doing a ridscan and
```

```
** 2) if table scan OR
**      index manager did not return a row marked deleted, then
**
** assert that we aren't looking for a RID that isn't on this page.
**
** In cases 1 and 2 if datarow is missing, we move on.
*/
if ((sdes->sindid != SCAN_RID)
    &&
    ( (sdes->sindid < SCAN_CLUST) || !indkey_del ))
{
        if ((uint16)homepginfo.rnum >= homepginfo.pg->dol_nextrno)
        {
                ex_callprint(EX_NUMBER(ACCESS2, NO_DATAROW_FOUND), EX_
                        homepginfo.rnum,
                        homepginfo.pg->dol_pageno,
                        SDES_OBJNAME_LEN(sdes),
                        SDES_OBJNAME(sdes),
                        SDES_DBNAME_LEN(sdes),
                        SDES_DBNAME(sdes));
                STB_ASSERT(0);
                sdes->sstat |= SS_ENDSCAN;

                /* cleanup and abort transaction */
                goto abort;
        }
}

tablescan = FALSE;
/*
** Index scan: look only at 'extra' sargs
*/
if (sdes->sindid > TABENTRY)
{
        num_sargs = sdes->sxtracnt;
        sargs = sdes->sargp + (sdes->sargcnt - sdes->sxtracnt);
}
/*
** Table scan: match up to last row
*/
else if (sdes->sindid == TABENTRY)
{
        end_rnum = homepginfo.pg->dol_nextrno -1;
        /*
        ** For first time through, if we are
        ** prefetching forwarded rows do it
        ** now.
        */
        if ((homepginfo.rnum == 0) && (sdes->sstat3 & SS3_APFFORW))
        {
                dol__prefetch_forwrows(sdes, homepginfo.pg);
        }

        if (sdes->sstat3 & SS3_OAMSCAN_PAGES)
        {
                tablescan = TRUE;
        }
}

CTS_CHECK(sdes, homepginfo.pg, (BYTE *)NULL);

/*
** If datapage locking, page not already locked,
** and RID REUSE is on, then block now -- we
** cannot qualify because there has been some
** premature garbage collection so we cannot
** be sure what we are supposed to block upon.
*/
if ((sdes->sstat3 & SS3_PAGELOCK) &&
        !homepginfo.is_locked &&
        (homepginfo.pg->dol_pprivstat & DOLPG_PRIV_RIDREUSED))
{

        MONITOR_INC(mc_dolaccess(dolscan_lock_ridreuse));
        glstat = dol__get_lock(sdes, curpginfo,
                        (DOL_PGINFO *)NULL, (BYTE *)NULL,
                        lock_duration);

        if (glstat != GL_OK && glstat != GL_DATAPG_CHANGED)
        {
                *index_restart = (glstat == GL_INDEXPG_CHANGED);
                goto abort;
        }
}

/*
** If there are no rows on this page, pass it to
** the housekeeper and move on.  We would have ALREADY
** blocked on RID_REUSE if necessary.
*/
if (homepginfo.pg->dol_nextrno == 0
    && !DOL_ISFIRSTPAGE_OPTBLORSLC(sdes,
                homepginfo.bp->bpage->dolp.dol_pageno))
{
        (void)hkgc_enq(SDES_DBID(sdes), homepginfo.bp);
        goto abort;
}

/*
** For each row
**      qualify the row
**      go to next row
** At the end of each iteration, obtain the end_rnum
** value from the home page because there is the
** possibility that the number of rows on the page
** may have changed. For example an uncommitted delete
** may have become a committed delete and removed.
*/
for (; homepginfo.rnum
        <= MIN(end_rnum, (homepginfo.pg->dol_nextrno-1));
        end_rnum = (sdes->sindid == TABENTRY) ?
                homepginfo.pg->dol_nextrno - 1 : end_rnum,
        homepginfo.rnum++)
requal:        {
        /*
        ** If the row offset entry is 0, DOL_GET_ROWPTR() will
        ** return NULL.  This indicates a deleted row, so
        ** continue to the next row.
        */
        if ((curpginfo->rnum >= curpginfo->pg->dol_nextrno)
          || ((currow = DOL_GET_ROWPTR(curpginfo->pg, curpginfo->rnum)
                == (BYTE *)NULL))
        {
                goto next_row;
        }


        /*
        ** Skip under the following circumstances:
        **      we are at a forwarded location and we aren't expectin
        **      row is deleted && (committed || level 0 || readpast)
        */
        if ((DOL_ROW_IS_FORWARDED_LOC(currow) && (curpginfo == &homep
            (DOL_ROW_IS_DELETED(currow) &&
                ((homepginfo.is_locked) ||
                (sdes->sstat & SS_LEVEL0) ||
                ((sdes->sstat & SS_READPAST) &&
                (!(sdes->sstat2 & SS2_BLKREADPAST))))))
        {
                goto next_row;
        }

        /*************************** QUALIFY SARGS ****************
        if (num_sargs)
        {
                qualified = qualsargs(currow, minlen, num_sargs, sarg
                        (int *)NULL);
        }

        QUALBRANCH(DOL_ROW_GET_STATUS(currow),
                (sdes->sindid > SCAN_NOINDEX),
                indkey_del, qualified,
                branch_bytep);
#if SANITY
        if ((sdes->sstat2 & SS2_QPSCAN) && TRACE(ACCESS,31))
                prQUALBRANCH(branch_bytep);
#endif

        /*
        ** Branch is
        **      QB_ROW_xxx | QB_IND_SCN | QB_IND_DEL | QB_QUAL
        */
        switch(branch)
        {
          /* ------------------BLOCK QUAL --------------- */
          /* insert: row qualifies, possibly uncommitted
          */
          case QB_ROW_INS|QB_NOIND_SCN|QB_IND_NODEL|QB_QUAL:
          case QB_ROW_INS|QB_IND_SCN  |QB_IND_NODEL|QB_QUAL:

          /* update: row qualifies, possibly uncommitted
          */
          case QB_ROW_UPD|QB_NOIND_SCN|QB_IND_NODEL|QB_QUAL:
          case QB_ROW_UPD|QB_IND_SCN  |QB_IND_NODEL|QB_QUAL:
                SANITY_TRACEQUAL(sdes, "\tBLOCK QUAL\n", NULL);
                /*
```

empty 09493187.032099 Page 6
code53/search.c

```
                ** We should never get here with an index delete.
                ** Row must qualify.
                */
                SYB_ASSERT(!(branch & QB_IND_DEL) &&
                           (branch & QB_QUAL));

                /*
                ** If we aren't level 0 we need to lock the row.
                ** If we aren't latching we know we don't need
                ** to lock (must have a table lock or a page
                ** lock).
                */
                if (!(sdes->sstat & SS_LEVEL0) &&
                        (sdes->sstat3 & (SS3_ROWLOCK|SS3_PAGELOCK)))
                {
                        if (!homepginfo.is_locked)
                        {
                                QB_GET_LOCK(sdes,
                                        &homepginfo,
                                        &forwpginfo,
                                        currow,
                                        lock_duration);
                        }

                        /* Get lock on forwarded location if
                        ** required AND if still doing
                        ** fine-grain locking
                        */
                        if ((curpginfo == &forwpginfo)
                            && !forwpginfo.is_locked
                            && (sdes->sstat3
                                & (SS3_ROWLOCK|SS3_PAGELOCK)))
                        {
                                QB_GET_LOCK(sdes,
                                        &forwpginfo,
                                        &homepginfo,
                                        currow,
                                        lock_duration);
                        }
                }
                goto row_return;


        /* -------------------BLOCK SKIP --------------- */
        /* insert: row qualifies, index scan, index key delete
        */
        case QB_ROW_INS|QB_IND_SCN  |QB_IND_DEL  |QB_QUAL:

        /* delete: row qualifies, possibly uncommit, !(indscan && !
        */
        case QB_ROW_DEL|QB_NOIND_SCN|QB_IND_NODEL|QB_QUAL:
        case QB_ROW_DEL|QB_IND_SCN  |QB_IND_DEL  |QB_QUAL:

        /* update:
        **      no index or index ins: uncommit and no qual
        **      index delete: quals or (noqual and uncommit)
        */
        case QB_ROW_UPD|QB_NOIND_SCN|QB_IND_NODEL|QB_NOQUAL:
        case QB_ROW_UPD|QB_IND_SCN  |QB_IND_NODEL|QB_NOQUAL:

        case QB_ROW_UPD|QB_IND_SCN  |QB_IND_DEL  |QB_QUAL:
        case QB_ROW_UPD|QB_IND_SCN  |QB_IND_DEL  |QB_NOQUAL:

        /* delete|update:
        **      possibly uncommit, not index scan
        **      possibly uncommit, index scan, index key delete
        */
        case QB_ROW_DELUPD|QB_NOIND_SCN|QB_IND_NODEL|QB_QUAL:
        case QB_ROW_DELUPD|QB_NOIND_SCN|QB_IND_NODEL|QB_NOQUAL:
        case QB_ROW_DELUPD|QB_IND_SCN  |QB_IND_DEL  |QB_QUAL:
        case QB_ROW_DELUPD|QB_IND_SCN  |QB_IND_DEL  |QB_NOQUAL:

                SANITY_TRACEQUAL(sdes, "\tBLOCK SKIP\n", NULL);
                /*
                ** If it isn't level 0 and it isn't already locked,
                ** gotta lock it to block for transaction isolation.
                ** We only need to block on the home RID.
                **
                ** If we aren't latching we know we don't need
                ** to lock (must have a table lock or a page
                ** lock).
                */
                if (!(sdes->sstat & SS_LEVEL0) &&
                        !homepginfo.is_locked &&
                        (sdes->sstat3 & (SS3_ROWLOCK|SS3_PAGELOCK)))
                {
                        MONITOR_INC(mc_dolaccess(dolscan_block_skip));
                        QB_GET_LOCK(sdes,
                                &homepginfo,
                                &forwpginfo,
                                currow,
                                LOCK_INSTANT);
                }
                break;

        /* ------------------- SKIP -------------------- */
        /* insert: row does not qualify
        */
        case QB_ROW_INS|QB_NOIND_SCN|QB_IND_NODEL|QB_NOQUAL:
        case QB_ROW_INS|QB_IND_SCN  |QB_IND_NODEL|QB_NOQUAL:
        case QB_ROW_INS|QB_IND_SCN  |QB_IND_DEL  |QB_NOQUAL:

        /* delete:  uncommit and noqual
        */
        case QB_ROW_DEL|QB_NOIND_SCN|QB_IND_NODEL|QB_NOQUAL:
        case QB_ROW_DEL|QB_IND_SCN  |QB_IND_DEL  |QB_NOQUAL:

                SANITY_TRACEQUAL(sdes, "\tSKIP\n", NULL);
                break;

        /* ------------------- INTERNAL ERROR ---------------
        ** We should have taken care of every possible combinatior
        ** above.  If something fell through, then there is a
        ** problem in the logic above.
        */
        default:
        }
next_row:
        /*
        ** Unkeep the forwarded page
        */
        if (curpginfo == &forwpginfo)
        {
                curpginfo = &homepginfo;
                if (forwpginfo.bp)
                {
                        bufunkeep(forwpginfo.bp,
                                sdes,
                                (forwpginfo.is_latched) ? UNLATCH : NC
                        forwpginfo.bp = (BUF *)NULL;
                        sdes->sforwbuf = (BUF *)NULL;
                }
                if (sdes->sforwlock)
                {
                        fgunlock(sdes, &sdes->sforwlock, FGUNLK_DIDNT(
                }
        }
        /*
        ** Unlock home if row locking
        */
        if (sdes->sdatalock && (sdes->sstat3 & SS3_ROWLOCK))
        {
                homepginfo.is_locked = FALSE;
                fgunlock(sdes, &sdes->sdatalock, FGUNLK_DIDNTQUALIFY);
        }

        /*
        ** Skipping this row - If it is deleted account for it.
        ** Note that the deleted row may be in an uncommitted state
        ** and it may be skipped 'cos it doesnt qualify or we are
        ** doing readpast or level0. Its accounted anyway.
        */
        if (tablescan && currow && DOL_ROW_IS_DELETED(currow))
        {
                sdes->scontext.scanscan.sdelrowcnt++;
        }
    }   /* end of for-each-row loop */
abort:
    /*
    ** We fell through.  The row didn't qualify.
    ** Clean up.  Unlatch,unkeep forwarded buffer.
    ** Unlatch home buffer.  If not index restart,
    ** unkeep the home buffer.
    */
    if (curpginfo == &forwpginfo)
    {
        if (forwpginfo.bp)
        {
                bufunkeep(forwpginfo.bp,
                        sdes,
                        (forwpginfo.is_latched) ? UNLATCH : NO_LATCH);
        }
```

```
			sdes->sforwbuf = (BUF *)NULL;
			SYB_ASSERT(!(sdes->sforwlock));
		}

		if (homepginfo.bp)
		{
			/*
			** If we know we don't need this page again,
			** then unkeep it.  We wont need it if we
			** are a table scan.
			*/
			if (sdes->sindid == TABENTRY)
			{
				bufunkeep(homepginfo.bp,
					sdes,
					(homepginfo.is_latched) ? UNLATCH : NO_LATCH);
				sdes->sdatabuf = (BUF *)NULL;
			}
			else if (homepginfo.is_latched)
			{
				BUF_UNLATCH(homepginfo.bp, pss);
			}
		}

		/*
		** Unlock home if row locking.  Unlock
		** the forwarded regardless.
		*/
		if (sdes->sdatalock && (sdes->sstat3 & SS3_ROWLOCK))
		{
			homepginfo.is_locked = FALSE;
			fgunlock(sdes, &sdes->sdatalock, FGUNLK_DIDNTQUALIFY);
		}
		if (sdes->sforwlock)
		{
			fgunlock(sdes, &sdes->sforwlock, FGUNLK_DIDNTQUALIFY);
		}

		/*
		** If it is a table scan, always set scur so we
		** know the last row we checked
		*/
		if (sdes->sindid == TABENTRY)
		{
			sdes->scur.row.rnum = end_rnum;
		}

		/*
		** We should have release the forward buffer
		*/
		SYB_ASSERT(sdes->sforwbuf == (BUF *)NULL);

		/*
		** Sync up the SDATABUF_PGLOCKED bit.
		*/
		if (sdes->sstat3 & SS3_PAGELOCK)
		{
			if (homepginfo.is_locked)
			{
				sdes->sstat3 |= SS3_SDATABUF_PGLOCKED;
			}
			else
			{
				sdes->sstat3 &= ~SS3_SDATABUF_PGLOCKED;
			}
		}

		/* if ending scan due to fatal errors abort transaction */
		if (sdes->sstat & SS_ENDSCAN)
		{
			ex_raise(SYSTEM, SYS_XACTABORT, EX_CONTROL, 0);
		}
		else
		{
			return FALSE;
		}
row_return:
		/*
		** Return the row.  If we are on a fowarded page,
		** set up the RID to be the home RID, but use
		** the forwarded row pointer.
		*/
		sdes->scur.row.rnum = homepginfo.rnum;
		sdes->scur.pageid = homepginfo.pg->dol_pageno;
		sdes->srow = currow;
		SYB_ASSERT(!DOL_ROW_IS_HAS_ADDR(currow));

		/* If returning a forwarded row, account for it */
		if (tablescan && DOL_ROW_IS_FORWARDED_LOC(currow))
		{
			sdes->scontext.soamscan.sforwrowcnt++;
		}

		/*
		** Be sure to unlatch the home page if we
		** are on the forwarded page.  Also, set up
		** sforwbuf.
		*/
		if (curpginfo == &forwpginfo)
		{
			if (homepginfo.is_latched)
			{
				BUF_UNLATCH(homepginfo.bp, pss);
			}
			sdes->sforwbuf = forwpginfo.bp;
		}
		if (curpginfo->is_latched)
		{
			sdes->sstat3 |= SS3_SROWLATCHED;
		}

		/*
		** Sync up the SDATABUF_PGLOCKED bit.
		*/
		if (sdes->sstat3 & SS3_PAGELOCK)
		{
			if (homepginfo.is_locked)
			{
				sdes->sstat3 |= SS3_SDATABUF_PGLOCKED;
			}
			else
			{
				sdes->sstat3 &= ~SS3_SDATABUF_PGLOCKED;
			}
		}
		return TRUE;
}
```

empty
code53/dol_getnext.c
Page 1

```
SYB_STATIC BUF *
dol__getpage    PROTO((SDES *, SYB_BOOLEAN, pgid_t pageid,
                      SYB_BOOLEAN, SYB_BOOLEAN,
                      SYB_BOOLEAN *, SYB_BOOLEAN *));

SYB_STATIC void
dol__badrow     PROTO((SDES *, DOL_DATAPAGE *, uint16, int));


/*
** FILE: DOL_GETNEXT.C
**
** Contains specific getnext code for each type
** of scan on dataonly locked tables.
*/

/*
** DOL_SCAN_UNLOCK_SDATABUF
**
** Macro to unlock sdatabuf.  If row locking, unlock
** status (to fgunlock()) depends on whether the
** current row qualified.  If datapage locking, check
** to see whether anyhting has qualified on this page.
** We only unlock when we are moving to the next
** row/page so we can always clear the row/page qualified
** bits at this point.
**
** Parameters:
**      (IN) sdes        - SDES *
**
** Returns:
**      <nothing>
**
** History
**      07/25/97 (jamie)         - created
*/
#define         DOL_SCAN_UNLOCK_SDATABUF(sdes, page_qualified)
do                                                                      \
{                                                                       \
        /*                                                              \
        ** Currently for lock scheme conversion this is causing         \
        ** undesirable stacktraces. Remove check for !ALTERTAB after     \
        ** fixing 135807.                                               \
        */                                                              \
        if (Pss->pcurcmd != ALTERTAB)                                   \
            SYB_ASSERT((DES_LOCKSCHEME(sdes->sdesp) != LOCK_ALLPAGES));  \
        if ((sdes)->sdatalock)                                          \
        {                                                               \
                /*                                                      \
                ** Make sure that we should have a lock                 \
                ** at this point.                                       \
                **                                                      \
                ** At level 0 or cursor instability we shouldn't        \
                ** have any locks.                                      \
                **                                                      \
                ** At level 3 we should have a table lock               \
                ** or the locks should be held by the index             \
                ** manager (in the index context structure),            \
                ** unless oamscan cursor.                               \
                */                                                      \
                SYB_ASSERT(!((sdes)->sstat & (SS_LEVEL0|SS_CURSINSTAB)));
                SYB_ASSERT(!(((sdes)->sstat & SS_L3LOCK) &&
                            (((sdes)->sindid != 0) ||
                             (!(((sdes)->sstat3 & SS3_OAMSCAN_PAGES) &&
                                ((sdes)->sstat2 & SS2_CURSOR))))));
                                                                        \
                if ((sdes)->sstat3 & SS3_ROWLOCK)                       \
                {                                                       \
                        if (page_qualified && SDES_GET_QPQUAL((sdes)))  \
                        {                                               \
                                fgunlock((sdes), &(sdes)->sdatalock,    \
                                        FGUNLK_QUALIFIED);              \
                        }                                               \
                        else                                            \
                        {                                               \
                                fgunlock((sdes), &(sdes)->sdatalock,    \
                                        FGUNLK_DIDNTQUALIFY);           \
                        }                                               \
                }                                                       \
                else                                                    \
                {                                                       \
                        /*                                              \
                        ** If we have a lock and we aren't row locking  \
                        ** we should be page locking.                   \
                        */                                              \
                        SYB_ASSERT((sdes)->sstat3 & SS3_PAGELOCK);      \
                        fgunlock((sdes), &(sdes)->sdatalock,            \
                                (page_qualified &&                      \
                                    ((sdes)->sstat3 & SS3_SDATABUFQUAL)) ?
                                    FGUNLK_QUALIFIED :                  \
                                    FGUNLK_DIDNTQUALIFY);               \
                }                                                       \
        }                                                               \
        SDES_CLEAR_QPQUAL((sdes));                                      \
        (sdes)->sstat3 &= ~(SS3_SDATABUFQUAL|SS3_SDATABUF_PGLOCKED);    \
} while (0)

/*
** DOL_GETNEXT_INIT
**
** getnext initialization common to all routines
** in this file.  Ensure that the forwarded row
** is not locked (it should be unlocked in getnext().
** End the scan if we have returned a row and
** SCANFIRST is set.  Handle SS_ENDSCAN.
**
** Parameters:
**      SDES *   - sdes
**
** Returns:
**      <none>
**
** History
**      07/25/97 (jamie)         - created
*/
#define         DOL_GETNEXT_INIT(sdes)
do                                                                      \
{                                                                       \
        /*                                                              \
        ** SS3_ONROW is only for apl tables                             \
        */                                                              \
        SYB_ASSERT(!(sdes->sstat3 & SS3_ONROW));                        \
                                                                        \
        /*                                                              \
        ** Forward location should have been cleaned up                 \
        ** getnext().                                                   \
        */                                                              \
        SYB_ASSERT(!(sdes)->sforwlock);                                 \
        SYB_ASSERT(!(sdes)->sforwbuf);                                  \
                                                                        \
        /* clear block-for-readpast status for next row */              \
        CLR_SS2_BLKREADPAST(sdes);                                      \
        /*                                                              \
        ** If we are datarow locking, we know we don't need to keep     \
        ** a lock on sdatabuf, so release it now.                       \
        */                                                              \
        if ((sdes)->sdatabuf && ((sdes)->sstat3 & SS3_ROWLOCK))         \
        {                                                               \
                DOL_SCAN_UNLOCK_SDATABUF((sdes), TRUE);                 \
        }                                                               \
                                                                        \
        if ((sdes)->sdatabuf && ((sdes)->sstat2 & SS2_SCANFIRST))       \
        {                                                               \
                (sdes)->sstat |= SS_ENDSCAN;                            \
        }                                                               \
                                                                        \
        if ((sdes)->sstat & SS_ENDSCAN)                                 \
        {                                                               \
                MONEVENT_SCAN_NEXT_END((sdes));                         \
                DOL_SCAN_UNLOCK_SDATABUF((sdes), TRUE);                 \
                if ((sdes)->sdatabuf)                                   \
                {                                                       \
                        bufunkeep((sdes)->sdatabuf, (sdes), UNLATCH_IF_LATCHE
                        (sdes)->sdatabuf = (BUF *)NULL;                 \
                }                                                       \
                                                                        \
                /*                                                      \
                ** Don't need to check sforwbuf since we asserted       \
                ** that it is null above.                               \
                */                                                      \
                return (BUF *)NULL;                                     \
        }                                                               \
        MONEVENT_SCAN_NEXT_REQUEST((sdes));                             \
} while (0)

/*
** DOL_GETNEXT_CLEANUP
**
** Cleanup at the end of scan.
**      sdatabuf: unlock with proper consideration to whether
**              the scan qualified.  unkeep and unlatch.
**      sforwbuf: unlock, didn't qualify (it cannot have qualified,
**              or else it would have been unlocked in getnext()).
**              unkeep and unlatch.
** Call endscan function, and set SS_ENDSCAN.
**
```

empty Page 2 code53/dol_getnext.c

```
** Parameters:
**      PSS                 - pss
**      SDES *              - sdes
**      SYB_BOOLEAN         - attnkill_flag: did we get an attention
**                                  or a kill.
**      SYB_BOOLEAN         - page_qualified: has this page qualified
**                                  access
**
** Returns:
**      <none>
**
** History
**      07/25/97 (jamie)            - created
*/
#define         DOL_GETNEXT_CLEANUP(pss, sdes, attnkill_flag, page_qualified)
do                                                                          \
{                                                                           \
        (sdes)->sstat |= SS_ENDSCAN;                                        \
        MONEVENT_SCAN_NEXT_END((sdes));                                     \
                                                                            \
        DOL_SCAN_UNLOCK_SDATABUF((sdes), page_qualified);                   \
                                                                            \
        /* Clear block-for-readpast status in case sdes is reused */        \
        CLR_SS2_BLKREADPAST(sdes);                                          \
        /*                                                                  \
        ** Unlock forwarded row/page.  It cannot                            \
        ** have qualified if we reached this point.                         \
        ** If it qualified it was unlocked in getnext()                     \
        */                                                                  \
        if ((sdes)->sforwlock)                                              \
        {                                                                   \
                fgunlock(sdes, &(sdes)->sforwlock, FGUNLK_DIDNTQUALIFY);    \
        }                                                                   \
        if ((sdes)->sdatabuf)                                               \
        {                                                                   \
                bufunkeep((sdes)->sdatabuf, (sdes), UNLATCH_IF_LATCHED);    \
                (sdes)->sdatabuf = (BUF *)NULL;                             \
        }                                                                   \
        if ((sdes)->sforwbuf)                                               \
        {                                                                   \
                bufunkeep((sdes)->sforwbuf, (sdes), UNLATCH_IF_LATCHED);    \
                (sdes)->sforwbuf = (BUF *)NULL;                             \
        }                                                                   \
        if ((sdes)->sendscan)                                               \
        {                                                                   \
                (*(sdes)->sendscan)((sdes));                                \
        }                                                                   \
        if ((attnkill_flag))                                                \
        {                                                                   \
                process_intattn((pss));                                     \
        }                                                                   \
} while (0)

/************************************************************************/
/*                DATA ONLY SCAN ROUTINES                               */
/************************************************************************/

/*
** DOL_OAMSCAN_GETNEXT()
**
** OAM scans on dataonly tables.  Consult the oam
** manager for each page allocated to this table.
** (note that the oam manager returns pages in
** deallocation -- this is needed because we may
** need to block on a row that has been deleted
** but which hasn't been committed yet).  The oam
** manager returns the page latched or locked as
** indicated at startscan time (see dol__startscan()).
** Qualification is performed on each row in the
** target page (note that if we are already on the
** last row we don't bother calling qualification, we
** just skip to the next page).
**
** Page validation is performed by the oam manager.
**
** Returns:
**      BUF *bp - location of the row contenxt (buffer
**                for sdes->srow).  Buffer is latched
**                if the page is not protected by a
**                page lock or a table lock.  Null
**                if nothing qualified (endscan).
**
** Affects:
**      sdes->srow      - points to the row that qualified.
**                        if forwarded, its the forwarded location.
**      sdes->scur      - home rid
**      sdes->sdatabuf  - home buffer
**      sdes->sforwbuf  - forwarded buffer if forwarded row, else
**                        null
**      sdes->sforw     - forwarded rid, only valid if sforwbuf
**                        is nonnull
**
** History:
**      07/26/97 (jamie)            - created
*/
BUF *
dol_oamscan_getnext(SDES * sdes)
{
        BUF             *bp = (BUF *)NULL;
        int             lret;                   /* return from BUF_LATCH/VERI
        SYB_BOOLEAN     index_restart = FALSE;  /* not applicable for oam scar
        SYB_BOOLEAN     att_or_kill = FALSE;    /* did we get an attention or
        SYB_BOOLEAN     page_qualified = TRUE;
        SYB_BOOLEAN     is_latched = TRUE;
        DOL_DATAPAGE    *datapgptr = NULL;
        pgid_t          curdatapg =0, curoampg = 0;
        LOCALPSS(pss);

        /*
        ** Assert that SS3_OAMSCAN_PAGES is set.
        */
        SYB_ASSERT(sdes->sstat3 & SS3_OAMSCAN_PAGES);

        DOL_GETNEXT_INIT(sdes);

        /*
        ** If we are already on a page and we are row locking or
        ** we are a level 0 scan, then latch the page now so we
        ** can go for another row.
        */
        if (sdes->sdatabuf)
        {
                bp = sdes->sdatabuf;

                /* set up curdatapg and curoampg */
                curdatapg = bp->bpage->dolp.dol_pageno;
                curoampg = SDES_OAMCTX_CUROAM(sdes);

                if (sdes->sstat3 & SS3_PGLATCH)
                {
                        /*
                        ** We are assuming that the buffer is kept in this
                        ** case so assert that this is true.
                        */
                        SYB_ASSERT(bufkeeptest(bp, sdes));

                        /*
                        ** If we don't already hold a page lock, then we
                        ** need to latch the page to examine it.
                        */
                        if (!((sdes->sstat3 & SS3_PAGELOCK) && sdes->sdataloc
                        {
                                BUF_LATCH(sdes, bp, SH_LATCH, UNCONDITIONAL_L
                        }
                }
#if 0
                /*
                ** Are we already on the last row?  If so,
                ** unlatch and unkeep now.  We can only do
                ** this if the RIDREUSE bit is not set (otherwise
                ** it is possible that someone has deleted rows
                ** and collected them even though they haven't
                ** committed).
                */
                if (!(bp->bpage->dolp.dol_pprivstat & DOLPG_PRIV_RIDREUSED) &
                        (sdes->scur.row.rnum >= (int16)(bp->bpage->dolp.dol_n
                {
                        /*
                        ** If there are no rows on this page, give it
                        ** to the HK to collect
                        */
                        if (sdes->scur.row.rnum == 0
                            && !DOL_ISFIRSTPAGE_OFTBLORSLC(sdes,
                                        bp->bpage->dolp.dol_pageno))
                        {
                                (void)hkgc_enq(SDES_DBID(sdes), bp);
                        }

                        bufunkeep(sdes->sdatabuf, sdes, UNLATCH_IF_LATCHED);
                        bp = (BUF *)NULL;
                        sdes->sdatabuf = (BUF *)NULL;
                }
#endif
        }

        /*
        ** Get the next row.
        */
```

empty
code53/dol_getnext.c
Page 3

```
while (TRUE)
{
        /*
        ** Get a row.  If we found one return.  Otherwise loop
        ** through and get another page.  dol_qualrow() acquires
        ** row locks if necessary, and also sets up scur.
        */
        if (bp)
        {
                /*
                ** Go to the next row.
                */
                sdes->scur.row.rnum++;

                /*
                ** If we aren't already on the last row, qualify
                ** the current row
                */
                is_latched = ((sdes->sstat3 & SS3_PGLATCH) &&
                                !((sdes->sstat3 & SS3_PAGELOCK) &&
                                        sdes->sdatalock));
                SYB_ASSERT(is_latched == buf_num_latches_held());
                if (((uint16)sdes->scur.row.rnum < bp->bpage->dolp.dol
                        dol_qualrow(sdes, bp, FALSE, is_latched, &inde
                {
                        MONEVENT_SCAN_NEXT(sdes);
                        return (sdes->sforwbuf) ? sdes->sforwbuf : bp;
                }

                /*
                ** dol_qualrow() failed.  Either no more rows to
                ** qualify, or there was a deadlock or an
                ** interrupt.  There should be no forwarded
                ** page.
                */
                SYB_ASSERT(!sdes->sforwbuf);
                SYB_ASSERT(!sdes->sforwlock);
                SYB_ASSERT(!index_restart);
                DOL_SCAN_UNLOCK_SDATABUF(sdes, page_qualified);
                page_qualified = FALSE;

                if (sdes->sdatabuf)
                {
                        bufunkeep(sdes->sdatabuf, sdes, UNLATCH_IF_LAT
                        sdes->sdatabuf = (BUF *)NULL;
                }

                /*
                ** If dol_qualrow() deadlocked, it set SS_ENDSCAN
                */
                if (sdes->sstat & SS_ENDSCAN)
                {
                        break;
                }
        }

        /*
        ** Get another page.  If we don't find one, then
        ** terminate the scan.
        **
        ** pg_oamscan_nextpage() is responsible for locking latching
        ** the target page.  It does not unkeep/unlock/unlatch, thoug
        */
        sdes->sdatabuf = bp = pg_oamscan_nextpage(sdes);

        if (!bp)
        {
                break;
        }

        SYB_ASSERT(pg_oamscan_sanitycheck(sdes, curdatapg, curoampg));

        /* See if scan encountered an empty page */
        datapgptr = &(bp->bpage->dolp);
        if (datapgptr->dol_ndeleted == datapgptr->dol_nextrno)
        {
                sdes->semptypgcnt++;
        }

        /*
        ** check for various async conditions - attention, kill,
        ** used up too much time but only if not system tbl
        */
        DOL_ATTKILL_OR_YIELD(pss, sdes, EXERATTN_116, att_or_kill);

        /*
        ** We are on a new page, so reset sdes->scur to precede
        ** the next row we are interested in (and we are always
        ** starting on row 0 for a new page).
                */
                sdes->scur.row.rnum = -1;

        } /* end of while loop */

        /*
        ** No more rows or we broke out of the scan on
        ** an attention or kill.
        */
        DOL_GETNEXT_CLEANUP(pss, sdes, att_or_kill, page_qualified);
        return (BUF *)NULL;
}


/*
** DOL_BT_GETNEXT()
**
** Index scans on dataonly tables.
**
** Page validation is performed by pg__validate_indscan().
** It uses BT_CURSCANPG_CHANGED() as cheap validation if
** the index key is an Insert.  Otherwise it uses expensive
** validation.
**
** Returns:
**      BUF *bp - location of the row contenxt (buffer
**                for sdes->srow).  Buffer is latched
**                if the page is not protected by a
**                page lock or a table lock.  Null
**                if nothing qualified (endscan).
**
** Affects:
**      sdes->srow      - points to the row that qualified.
**                        if forwarded, its the forwarded location.
**      sdes->scur      - home rid
**      sdes->sdatabuf  - home buffer
**      sdes->sforwbuf  - forwarded buffer if forwarded row, else
**                        null
**      sdes->sforw     - forwarded rid, only valid if sforwbuf
**                        is nonnull
**
** History:
**      07/26/97 (jamie)        - created
*/
BUF *
dol_bt_getnext(SDES * sdes)
{
        BUF                     *bp, *indexbp;
        int                     lret;   /* return from getpage() */
        SYB_BOOLEAN             indrestart;
        SYB_BOOLEAN             indkeydel;
        SYB_BOOLEAN             qualified_access;
        SYB_BOOLEAN             att_or_kill = FALSE; /* did we get an attentic
        BT_GNEXTTYPE            next;
        VALIDATION_CONTEXT      vctx;
        VALIDATION_CONTEXT      *vctxp;
        int                     latcharg;
        SYB_BOOLEAN             page_qualified = TRUE;
        LOCALPSS(pss);

        /*
        ** Assert that we are scanning via an index
        */
        SYB_ASSERT(sdes->sindid > 0);

        DOL_GETNEXT_INIT(sdes);

        bp = sdes->sdatabuf;

        vctx.vtarget_objid = SDES_OBJID((sdes));
        vctx.vtarget_indid = TABENTRY;
        vctx.validation_type = VALIDATE_FOR_INDSCAN;
        vctx.voampg_ok = FALSE;

        next = BT_NEXTROW;
        qualified_access = TRUE;
        while (indexbp = bt_getnext(sdes, next,
                (qualified_access) ? SDES_GET_QPQUAL(sdes) : FALSE,
                &indkeydel))
        {
                /*
                ** Forward buffer should never be kept here.
                ** If we restart we should unkeep it first.
                ** If row doesn't qual, dol_qualrow() should
                ** have released it.  And getnext() should
                ** never call us with it kept.
                */
                SYB_ASSERT(!sdes->sforwbuf);
```

```
/*
** Covered query, return now.
*/
if (sdes->sstat & SS_NODATA)
{
        /*
        ** We shouldn't have any access SARGs.
        */
        SYB_ASSERT(sdes->sxtracnt == 0);

        /* for covered query we are all set */
        return indexbp;
}

/*
** bt_getnext may call bt__copykeyval_dp and that sometimes
** unkeeps what is in sdes->sdatabuf and replaces it with
** a different page. So make sure that bp is in in sync with
** sdes->sdatabuf.
*/
bp = sdes->sdatabuf;

/*
** If next row happens to be on the page we already have,
** all we need to do is relatch it.  Otherwise we need
** to unkeep and get the correct one.  We are assuming
** that bp is kept if it is non-NULL.
*/
if (bp && (sdes->scur.pageid == bp->bpage->dolp.dol_pageno))
{
        /*
        ** We are assuming that the buffer is kept in this ca
        ** so assert that this is true.
        */
        SYB_ASSERT(bufkeeptest(bp, sdes));

        /*
        ** If we are latching and we don't hold a page
        ** lock, then latch it.
        */
        if ((sdes->sstat3 & SS3_PGLATCH) &&
            !((sdes->sstat3 & SS3_PAGELOCK) &&
                (sdes->sdatalock ||
                (sdes->sstat3 &
                        (SS3_LOCKEDPREAQUAL|SS3_SDATABUF_PGLOC
        {
                latcharg = SH_LATCH;
                BUF_LATCH(sdes, bp, SH_LATCH,
                        UNCONDITIONAL_LATCH, lret);
        }
        else
        {
                latcharg = NO_LATCH;
                if (sdes->sdatalock)
                {
                        /*
                        ** The lock we hold should be on the 
                        ** page.
                        */
                        SYB_ASSERT(LOCKREC_PAGENO(sdes->sdata
                                        sdes->scur.pa
                        /*
                        ** We shouldn't hold a row lock
                        */
                        SYB_ASSERT(!(sdes->sstat3 & SS3_ROWLO
                }
        }
}
/*
** Get the target page.
*/
else
{
        /*
        ** Must release what we have before calling getpage()
        ** Note that in the case of a cursor we might actuall
        ** be holding a lock on the correct page even though
        ** we no longer have the buffer kept.  So only releas
        ** the lock if the page isn't page locked and
        ** we have it locked.  No latching/validation if we
        ** have a page lock.
        */
        if ((sdes->sstat3 & SS3_PAGELOCK) && sdes->sdatalock 
                (LOCKREC_PAGENO(sdes->sdatalock) == sdes->scu
        {
                vctxp = (VALIDATION_CONTEXT *)NULL;
                latcharg = NO_LATCH;
        }
        /*
        ** Else, we don't have this page locked.  If
        ** we have a lock, release it.
        */
        else
        {
                DOL_SCAN_UNLOCK_SDATABUF(sdes, page_qualified)
                page_qualified = FALSE;
                vctxp = (sdes->sstat3 & SS3_INDVALIDATION) ?
                                &vctx : (VALIDATION_CONTEXT *)
                latcharg = (sdes->sstat3 & SS3_PGLATCH) ?
                                SH_LATCH : NO_LATCH;
        }
        if (bp)
        {
                bufunkeep(bp, sdes, UNLATCH_IF_LATCHED);
                sdes->sdatabuf = (BUF *) NULL;
        }

        /*
        ** Set the level of the index page for the
        ** buffermgr.  If we are using validation,
        ** pass in a validation context.  Set up with
        ** index key info.  Indicate that this page
        ** hasn't been checked yet.
        */
        sdes->sindlevel = IND_LEVEL_DATA;
        sdes->sbufinfo = &sdes->sbl_data;
        vctx.validation_info.vindscaninfo.indscv_inddelete =
        vctx.validation_info.vindscaninfo.indscv_indpgchecked
        vctx.validation_info.vindscaninfo.indscv_indpgchanged

        bp = sdes->sdatabuf = getpage_with_validation(sdes,
                latcharg,
                UNCONDITIONAL_LATCH,
                &lret,
                vctxp);

        /*
        ** Page invalid -- either validation failed
        ** or the index page changed (which was checked
        ** during validation).  If the index changed we
        ** unlatch the data page but don't unkeep it because
        ** we are likely to return to this page after
        ** restarting.  Note that the page must be latched
        ** because we wouldn't be validating otherwise.
        */
        if ((bp == (BUF *)NULL) ||
                vctx.validation_info.vindscaninfo.indscv_indp
        {
                /*
                ** If buffer manager returns NULL bp, that me
                ** a page whose deallocation has committed. S
                ** in the same way as a committed delete is s
                ** On the other hand if bp is not NULL but th
                ** has changed, ask the index manager to retu
                ** row again.
                */
                next = (!bp) ? BT_NEXTROW : BT_CURROW;
                if (bp && (latcharg == SH_LATCH))
                {
                        BUF_UNLATCH(bp, pss);
                }
                continue;
        }

        /*
        ** If the page was valid but we haven't checked to
        ** see if the index changed, then we need to do
        ** so now unless we hold a page lock.  This can
        ** happen if the page was already validated in
        ** cache by someone else.  We know the page is
        ** latched because we wouldn't be validating if
        ** we have a table lock or if the index manager is
        ** acquiring locks.
        */
        if (vctxp &&
            !vctx.validation_info.vindscaninfo.indscv_ind
        {
                if (BT_CURSCANPG_CHANGED(sdes))
                {
                        next = BT_CURROW;
                        BUF_UNLATCH(bp, pss);
                        continue;
                }
        }
}
/*
```

```
            ** check for various async conditions - attention, kill,
            ** used up too much time but only if not system tbl
            */
            DOL_ATTKILL_OR_YIELD(pss, sdes, EXERATTN_117, att_or_kill);

            /*
            ** Qualify the rid.  If it fails to qualify, go
            ** to the next rid.
            */
            indrestart = FALSE;
            qualified_access = dol_qualrow(sdes, bp, indkeydel,
                                (latcharg == SH_LATCH), &indre
            BT_COPYKEY_IFNEEDED(sdes, sdes->srow,
                                sdes->sminlen, qualified_access);

            if (qualified_access)
            {
                    MONEVENT_SCAN_NEXT(sdes);
                    return (sdes->sforwbuf) ? sdes->sforwbuf : bp;
            }
            qualified_access = FALSE;

            /*
            ** Buffer was unlatched in dol_qualrow()
            */
            SYB_ASSERT(buf_num_latches_held() == 0);

            /*
            ** If dol_qualrow() deadlocked or we got
            ** an attention, it set SS_ENDSCAN
            */
            if (sdes->sstat & SS_ENDSCAN)
            {
                    break;
            }
            /*
            ** If we have to restart, tell the
            ** index manager to return the same
            ** row again.
            */
            else if (indrestart)
            {
                    if (sdes->sforwbuf)
                    {
                            bufunkeep(sdes->sforwbuf, sdes, UNLATCH_IF_LA1
                            sdes->sforwbuf = (BUF *)NULL;
                    }
                    next = BT_CURROW;
                    continue;
            }
            MONITOR_INC(mc_dolaccess(dolbt_datasargfail));

            /*
            ** By default, we want to get the next
            ** row from the index manager.
            */
            next = BT_NEXTROW;
    } /* loop on each rid from bt_getnext() */

    /*
    ** No match.  End the scan.  Unkeep and unlatch
    ** (if needed) the current data page.
    */
    DOL_GETNEXT_CLEANUP(pss, sdes, att_or_kill, page_qualified);
    return (BUF *)NULL;
}
```

What is claimed is:

1. In a database system having a database storing a database table comprising a plurality of data rows, said rows storing information organized into particular database fields, an improved method for granting access during a table scan to particular rows that meet a specified scan criterion, said table scan occurring during execution of multiple concurrent transactions, the method comprising:

providing each row of the database table with delete and update status flags for indicating which rows may be skipped during the table scan, wherein:

(i) the update status flag for a row is set when a transaction updates the row and is cleared when the transaction commits, (ii) the delete status flag for a row is set when a transaction delete a a row and is cleared when the transaction rolls back, and (iii) both the update and delete status flags for a row are restored to their respective prior states when a transaction rolls back that had flagged the row as updated;

based on said status flags, determining those rows of the database table that may be skipped during the table scan; and granting access to particular rows of the database table that meet said specified scan criterion and have not been determined to be rows that may be skipped.

2. The method of claim 1, wherein said granting step includes:

if neither one of the status flags for a particular row have been set, granting access to the particular row if the particular row qualifies the specified scan criterion.

3. The method of claim 1, wherein said granting step includes:

if neither one of the status flags for a particular row have been set, skipping the particular row if the particular row fails to qualify the specified scan criterion.

4. The method of claim 3, wherein the particular row is skipped regardless of whether there exists another concurrently pending transaction in the system that might roll back.

5. The method of claim 1, wherein said granting step includes:

if the delete status flag for a particular row has been set, skipping the particular row if the row is not blocked by another concurrent transaction.

6. The method of claim 1, wherein said granting step includes:

if the delete status flag for a particular row has been set, skipping the particular row if the particular row fails to qualify the specified scan criterion.

7. The method of claim 6, wherein the particular row is skipped regardless of whether the particular row is blocked by another concurrent transaction.

8. The method of claim 1, wherein said granting step includes:

if the update status flag for a particular row has been set, granting access to the particular row if the particular row qualifies the specified scan criterion.

9. The method of claim 1, wherein said granting step includes:

if the update status flag for a particular row has been set, skipping the particular row if the particular row fails to qualify the specified scan criterion and the particular row is not blocked by another concurrent transaction.

10. The method of claim 1, wherein said granting step includes:

if both of the status flags for a particular row have been set, skipping the particular row if the particular row is not blocked by another concurrent transaction.

11. The method of claim 1, wherein said granting step includes:

if the delete status flag has been set for a particular row that does not meet the specified scan criterion but the particular row is blocked by another concurrent transaction, waiting for the concurrent transaction to commit or roll back.

12. The method of claim 11, further comprising:

if the concurrent transaction rolls back, clearing the delete status flag.

13. The method of claim 11, further comprising:

if the concurrent transaction commits, skipping the particular row.

14. The method of claim 1, wherein said granting step includes:

if the update status flag has been set for a particular row that does not meet the specified scan criterion but the particular row is blocked by another concurrent transaction, waiting for the concurrent transaction to commit or roll back.

15. The method of claim 14, further comprising:

if the concurrent transaction rolls back, clearing the update status flag.

16. The method of claim 14, further comprising:

if the concurrent transaction commits, skipping the particular row.

17. The method of claim 1, wherein said granting step includes:

if both of the status flags for a particular row have been set but the particular row is blocked by another concurrent transaction, waiting for the concurrent transaction to commit or roll back.

18. The method of claim 17, further comprising:

if the concurrent transaction rolls back, clearing at least the delete status flag.

19. The method of claim 17, further comprising:

if the concurrent transaction commits, skipping the particular row.

20. The method of claim 1, wherein the delete status flag comprises a "row delete" status bit.

21. The method of claim 1, wherein the update status flag comprises a "row update" status bit.

22. The method of claim 1, wherein the update status flag of a particular row is set by a transaction that inserted the particular row into the database table.

23. The method of claim 22, wherein the delete status flag of the particular row is set if the transaction that inserted the particular row into the database table rolls back.

24. The method of claim 1, wherein said specified scan criterion is based, at least in part, on a database query.

25. The method of claim 24, wherein said database query comprises a data manipulation language (DML) statement.

26. In a database system having a database storing a database table comprising a plurality of data rows, said rows storing information organized into particular database fields, said database table having an index for logically ordering said plurality of rows, an improved method for granting access to particular rows that meet a specified query criterion during execution of multiple concurrent transactions, the method comprising:

providing each index row of the index with a delete status flag for indicating that an index key of the index is marked for deletion;

providing each row of the database table with delete and update status flags for indicating particular rows that may be skipped during the table scan, wherein:

(i) the update status flag for a row is set when a transaction updates the row and is cleared when the transaction commits, (ii) the delete status flag for a row is set when a transaction deletes a row and is cleared when the transaction rolls back, and (iii) both the update and delete status flags for a row are restored to their respective prior states when a transaction rolls back that had flagged the row as updated;

based on said index and row status flags, determining those rows of the database table that may be skipped as not meeting specified query criterion; and granting access to particular rows of the database table that meet said specified query criterion and have not been determined to be rows that may be skipped.

27. The method of claim 26, wherein said granting step includes:

if neither one of the status flags for a particular row have been set and the particular row qualifies the specified query criterion, waiting for access to the particular row if the particular row is blocked by another concurrent transaction.

28. The method of claim 26, wherein said granting step includes:

if neither one of the status flags for a particular row have been set and the particular row fails to qualify the specified query criterion, skipping the particular row regardless of whether the particular row is blocked by another concurrent transaction.

29. The method of claim 28, wherein the particular row is skipped regardless of whether there exists another concurrently pending transaction in the system that might rolls back.

30. The method of claim 26, wherein said granting step includes:

if the delete status flag for a particular row has been set and the particular row qualifies the specified query criterion, skipping the particular row if the particular row is not blocked by another concurrent transaction.

31. The method of claim 26, wherein said granting step includes:

if the delete status flag for a particular row has been set and the particular row fails to qualify the specified query criterion, skipping the particular row regardless of whether another concurrent transaction is blocking the particular row.

32. The method of claim 31, wherein the particular row is skipped regardless of whether there exists another concurrently pending transaction in the system that might roll back.

33. The method of claim 26, wherein said granting step includes:

if the update status flag for a particular row has been set, skipping the particular row if the particular row is not blocked by another concurrent transaction.

34. The method of claim 33, wherein occurrence of said skipping step is without regard to whether the particular row qualifies the specified query criterion.

35. The method of claim 26, wherein said granting step includes:

if the update status flag has been set for a particular row that is blocked by another concurrent transaction, waiting for the concurrent transaction to commit or roll back.

36. The method of claim 35, wherein the particular row is skipped if the concurrent transaction commits.

37. The method of claim 26, wherein said granting step includes:

if both of the status flags for a particular row have been set, skipping the particular row if the particular row is not blocked by another concurrent transaction.

38. The method of claim 26, wherein said granting step includes:

if both of the status flags have been set for a particular row that is blocked by another concurrent transaction, waiting for the concurrent transaction to commit or roll back.

39. The method of claim 38, wherein the particular row is skipped if the concurrent transaction commits.

40. The method of claim 39, wherein occurrence of said skipping step is without regard to whether the particular row qualifies the specified query criterion.

41. A client/server database system having a database storing a database table comprising a plurality of data records, said data records storing information organized into particular database fields, comprising:

a server connect to a client;

computer-implemented program logic for transmitting from the client to the server a query specifying a particular database transaction affecting data records of the database table, each data record being associated with delete and update status flags for indicating which records are to be deleted or updated, respectively, by another transaction that is concurrently executing;

computer-implemented program logic for determining, based on said status flags and conformance to said query, which records of the database table need to be blocked from access by other transactions, during execution of the particular database transaction; and computer-implemented program logic for blocking only those particular records of the database table which been determined to be records that need to the blocked.

42. The system of claim 41, wherein:

(i) the update status flag for a record is set when a transaction updates the record and is cleared when the transaction commits, (ii) the delete status flag for a record is set when a transaction deletes a record and is cleared when the transaction rolls back, and (iii) both the update and delete status flags for a record are restored to their respective prior states when a transaction rolls back that had flagged the record as updated.

43. The system of claim 41, wherein said computer-implemented program logic for blocking access provides access to a particular record when the particular record conforms to the query and neither one of the status flags for the particular record have been set.

44. The system of claim 41, wherein said computer-implemented program logic for blocking access does not block a particular record when neither one of the status flags for the particular record have been set and the particular record fails to conform to the query.

45. The system of claim 41, wherein said computer-implemented program logic for blocking access does not block a particular record when the delete status flag for the particular record has been set and the record is not blocked by another concurrent transaction.

* * * * *